United States Patent
Yao et al.

(10) Patent No.: US 12,460,514 B2
(45) Date of Patent: Nov. 4, 2025

(54) SYSTEMS AND METHODS FOR EVALUATING SECURING SYSTEMS FOR FLOATING STRUCTURES USING VIRTUAL SENSORS

(71) Applicant: Chevron U.S.A. Inc., San Ramon, CA (US)

(72) Inventors: Aifeng Yao, Houston, TX (US); Xiaoyan Yan, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 985 days.

(21) Appl. No.: 17/496,305

(22) Filed: Oct. 7, 2021

(65) Prior Publication Data

US 2023/0114745 A1    Apr. 13, 2023

(51) Int. Cl.
| | | |
|---|---|---|
| *E21B 43/01* | (2006.01) | |
| *E21B 43/017* | (2006.01) | |
| *B63B 21/00* | (2006.01) | |
| *B63B 21/50* | (2006.01) | |
| *B63B 35/44* | (2006.01) | |
| *B63B 79/00* | (2020.01) | |

(52) U.S. Cl.
CPC ........ *E21B 43/0107* (2013.01); *E21B 43/017* (2013.01); *B63B 2021/008* (2013.01); *B63B 2021/009* (2013.01); *B63B 21/50* (2013.01); *B63B 35/44* (2013.01); *B63B 79/00* (2020.01)

(58) Field of Classification Search
CPC ... E21B 43/0107; E21B 43/017; B63B 79/00; B63B 21/50; B63B 35/44; B63B 2021/008; B63B 2021/009
See application file for complete search history.

(56) References Cited

U.S. PATENT DOCUMENTS

| | | |
|---|---|---|
| 2012/0037240 A1 | 2/2012 | Adkins et al. |
| 2014/0324351 A1* | 10/2014 | Dannevik ............... G08B 21/10 702/3 |
| 2016/0217379 A1 | 7/2016 | Patri et al. |
| 2020/0317299 A1 | 10/2020 | Basu et al. |

OTHER PUBLICATIONS

Matsumoto S, Jaiswal V, Sugimura T, Honjo S, Szalewski P. Mooring Integrity Management through Digital Twin and Standardized Inspection Data. InOffshore Technology Conference Aug. 9, 2021 (p. D041S049R006). OTC. (Year: 2021).*

(Continued)

*Primary Examiner* — Chuen-Meei Gan
(74) *Attorney, Agent, or Firm* — Smith & Woldesenbet Law Group, PLLC

(57) ABSTRACT

A method for evaluating a securing system for a floating structure, where the method includes collecting a plurality of metocean data from a plurality of metocean sensor devices during a current time period coinciding with a field operation, where the field operation is conducted from the floating structure that is stabilized by the securing system. The method can also include evaluating the metocean data using a plurality of algorithms. The method can further include determining, based on evaluating the metocean data, a condition of the securing system at the current time period.

19 Claims, 22 Drawing Sheets

(56) References Cited

OTHER PUBLICATIONS

Ma KT, Garrity R, Longridge K, Shu H, Yao A, Kwan T. Improving reliability of MODU mooring systems through better design standards and practices. InOffshore Technology Conference May 1, 2017 (p. D031S034R004). OTC. (Year: 2017).*

Wisch D, Spong R. Recommended practice for structural integrity management of floating offshore structures—A DeepStar 12401 product. InOffshore Technology Conference May 2, 2016 (p. D011S012R001). OTC. (Year: 2016).*

Kari Rodriquez, International Search Report, Dec. 15, 2022, 2 pages, USPTO as receiving office.

Kari Rodriquez, Written Opinion of the International Search Authority, Dec. 15, 2022, 5 pages, USPTO as receiving office.

* cited by examiner

1279-1

1279-2

1279-3

1279-4

SYSTEMS AND METHODS FOR EVALUATING SECURING SYSTEMS FOR FLOATING STRUCTURES USING VIRTUAL SENSORS

TECHNICAL FIELD

The present application is related to offshore field operations and, more particularly, to systems and methods for systems and methods for evaluating securing systems for floating structures using virtual sensors.

BACKGROUND

In deep water operations, securing systems for floating structures (e.g., an oilfield platform, a pipeline) are often used to keep the floating structure stable and maintained in a relatively fixed location within a body of water (e.g., a lake, an ocean). In such environments, the securing systems (or portions thereof) are subjected to a harsh environment. High pressures, low temperatures, surface winds, salt water, and turbulence are but a few of the factors that can lead to the deterioration of the securing system or portions thereof (e.g., mooring lines).

For reliability and regulatory reasons, the integrity of a securing system must be constantly maintained. If the development of a problem is detected, an operator must be immediately notified so that prompt remedial action can be taken. While sensors specifically designed to monitor the integrity of securing systems and their various components exist, these sensors, exposed to the harsh environment discussed above, tend to deteriorate and/or fail after a relatively short period of time (e.g., one year, two years) during a field operation and/or use of the securing system.

SUMMARY

In general, in one aspect, the disclosure relates to a method for evaluating a securing system for a floating structure. The method can include collecting a plurality of metocean data from a plurality of metocean sensor devices during a current time period coinciding with a field operation, where the field operation is conducted from the floating structure that is stabilized by the securing system. The method can also include evaluating the metocean data using a plurality of algorithms. The method can further include determining, based on evaluating the metocean data, a condition of the securing system at the current time period.

In another aspect, the disclosure relates to a system for evaluating mooring lines positioned in water. The system can include a plurality of metocean sensor devices for measuring a plurality of metocean data coinciding with a field operation, where the field operation is conducted from a floating structure that is stabilized by the mooring lines in the water. The system can also include a controller communicably coupled to the plurality of metocean sensor devices. The controller can be configured to collect the plurality of metocean data from the plurality of metocean sensor devices. The controller can also be configured to evaluate the plurality of metocean data using a plurality of algorithms. The controller can further be configured to determine, based on evaluating the plurality of metocean data, a level of tension in each of the mooring lines. The controller can also be configured to identify a failure in at least one of the mooring lines based on the level of tension falling outside a range of acceptable values.

In yet another aspect, the disclosure relates to a non-transitory computer readable medium comprising computer readable program code, which when executed by a computer processor, enables the computer processor to collect a plurality of metocean data from a plurality of metocean sensor devices during a field operation, where the field operation is conducted from a floating structure that is stabilized by the mooring lines in water. The computer processor can also be enabled to evaluate the metocean data using a plurality of algorithms. The computer processor can further be enabled to determine, based on evaluating the metocean data, a level of tension in each of the mooring lines. The computer processor can also be enabled to identify a failure in at least one of the mooring lines based on the level of tension falling outside a range of acceptable values.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DESCRIPTION OF THE INVENTION

Figure 1:
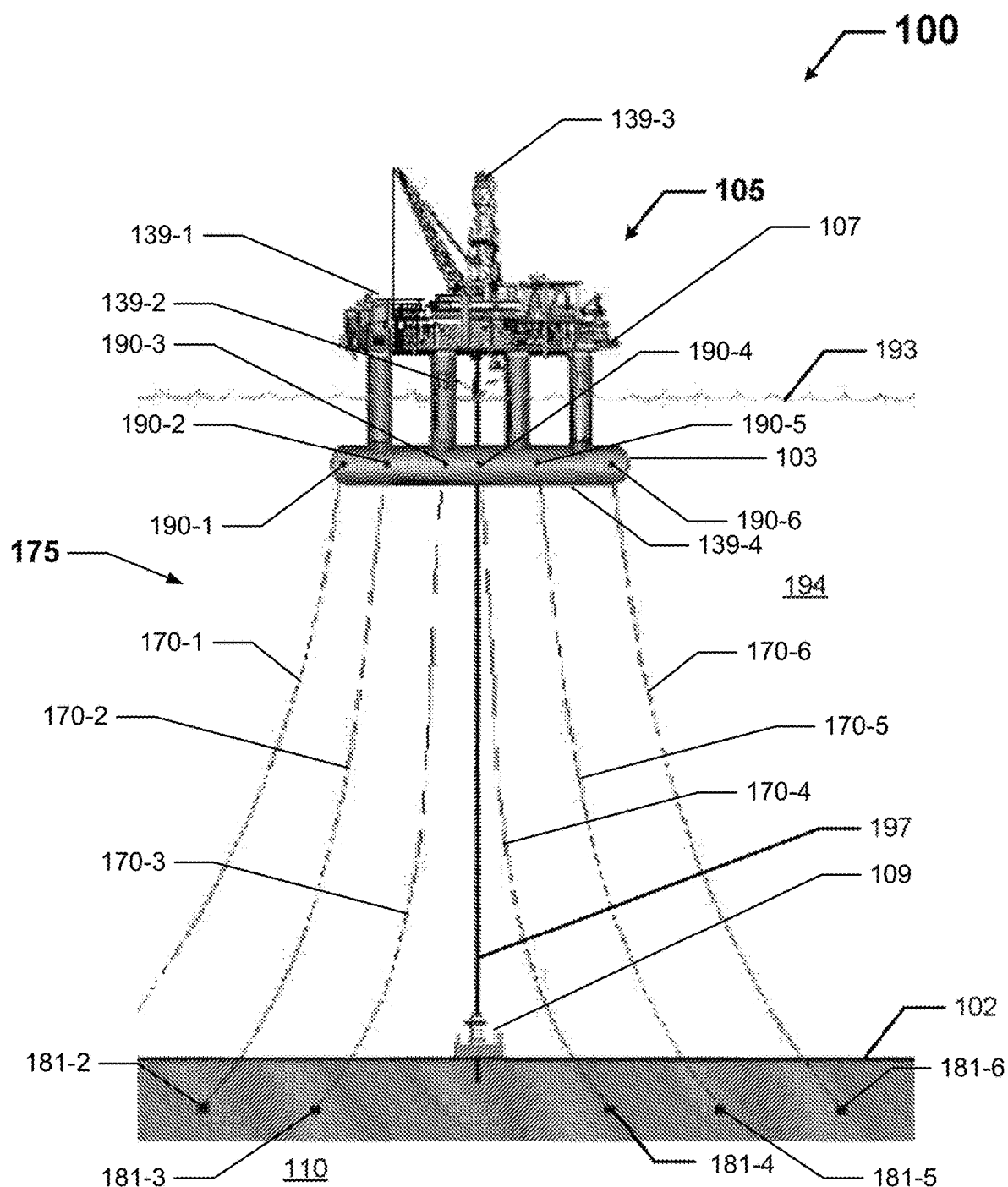
FIG. 1 shows a subsea field system in which a securing system that includes mooring lines according to certain example embodiments.

The example embodiments discussed herein are directed to systems and methods for evaluating securing systems for floating structures using virtual sensors. The securing systems are used in conjunction with floating structures that are used in a field operation. Examples of a floating structure that are secured by securing systems can include, but are not limited to, a platform, a ship, a pipeline, a riser, a hull, an umbilical, a semi-submersible platform, a SPAR floating platform, a floating vessel (e.g., a floating production storage and offloading (FPSO) vessel, a floating storage and offloading (FSO) vessel, a floating drilling production storage and offloading (FDPSO) vessel, a floating storage regasification unit (FSRU) vessel), and a wind turbine assembly. Securing systems described herein can have any of a number of configurations and/or components. For example, a securing system can include multiple (e.g., eight, four, ten) mooring lines. The configuration of a securing system can vary based on one or more of a number of factors, including but not limited to the characteristics (e.g., mass, shape) of floating the floating structure, the characteristics (e.g., salinity, strength and direction of tidal currents, turbulence, depth) of the body of water, and the characteristics (e.g., speed, direction) of the wind.

As defined herein, metocean data is any data that is associated with wind, wave, and/or climate conditions that can affect a floating structure in a field operation and/or are measurable with respect to a floating structure in a field operation. In other words, metocean data as defined herein is broader than simply meteorological and oceanic data by also including position and motion data of a floating structure. Examples of metocean data can include, but are not limited to, air temperature, humidity, wind speed, wind direction, current speed, current direction, heave, roll, pitch, heading, acceleration of surge, acceleration of sway, acceleration of heave, rate of roll, rate of pitch, rate of heading, static and dynamic six degrees of freedom (6-DoF) motions for surge, sway, heave, roll, pitch, and yaw of a floating structure.

Field operations can involve drilling, completing, transporting, and or producing a subterranean resource that is extracted from a subterranean formation. Examples of a subterranean resource can include, but are not limited to, natural gas, oil, and water. Alternatively, field operations can involve the generation of electricity. Generally, a field operation is defined by the purpose for which the floating structure is used. A field operation can last for any duration of time (e.g., one month, one year, one decade) and can be continuous or have multiple interruptions or pauses. Example embodiments of systems and methods for evaluating securing systems for floating structures using virtual sensors can be rated for use in hazardous environments.

The securing systems (including portions (e.g., mooring lines) thereof) evaluated using example embodiments are located, at least in part, under water (e.g., a sea, an ocean, a lake), also called subsea herein. The floating structure to which the securing structure is attached can be at least partially disposed, directly or indirectly, within the same body of water as the securing structure (or portions thereof). A user as defined herein can be any person associated with a field operation in which a floating structure is used. Examples of a user can include, but are not limited to, an engineer, a company representative, a consultant, an operator, a technician, an electrician, and a mechanic.

Securing systems for floating structures that are evaluated by example embodiments includes multiple components, where a component can be made from a single piece (as from a mold or an extrusion). When a component (or portion thereof) of a securing system for floating structures is made from a single piece, the single piece can be cut out, bent, stamped, and/or otherwise shaped to create certain features, elements, or other portions of the component. Alternatively, a component (or portion thereof) of a securing system for a floating structure can be made from multiple pieces that are mechanically coupled to each other. In such a case, the multiple pieces can be mechanically coupled to each other using one or more of a number of coupling methods, including but not limited to adhesives, welding, fastening devices (e.g., bolts), compression fittings, mating threads, and slotted fittings. One or more pieces that are mechanically coupled to each other can be coupled to each other in one or more of a number of ways, including but not limited to fixedly, hingedly, rotatably, removably, slidably, and threadably.

Components and/or features described herein can include elements that are described as coupling, fastening, securing, or other similar terms. Such terms are merely meant to distinguish various elements and/or features within a component or device and are not meant to limit the capability or function of that particular element and/or feature. For example, a feature described as a "coupling feature" can couple, secure, abut against, fasten, and/or perform other functions aside from merely coupling. In addition, each component and/or feature described herein (including each component of an example system for evaluating a securing system for a floating structure during a field operation) can be made of one or more of a number of suitable materials, including but not limited to metal (e.g., stainless steel), ceramic, rubber, glass, and plastic.

A coupling feature (including a complementary coupling feature) as described herein can allow one or more components and/or portions of a system used in a field operation, including an example system for evaluating securing systems for floating structures using virtual sensors, to become mechanically coupled, directly or indirectly, to another portion and/or component of the system used in the field operation. A coupling feature can include, but is not limited to, a portion of a hinge, an aperture, a recessed area, a protrusion, a slot, a spring clip, a tab, a detent, and mating threads. One portion of a system used in a field operation can be coupled to another portion and/or component of the system by the direct use of one or more coupling features.

In addition, or in the alternative, a portion of an example system used in a field operation, including an example system for evaluating securing systems for floating structures using virtual sensors, can be coupled to another portion of the system using one or more independent devices that interact with one or more coupling features disposed on a component of the system. Examples of such devices can include, but are not limited to, a pin, a hinge, a fastening device (e.g., a bolt, a screw, a rivet), an adapter, and a spring. One coupling feature described herein can be the same as, or different than, one or more other coupling features described herein. A complementary coupling feature as described herein can be a coupling feature that mechanically couples, directly or indirectly, with another coupling feature.

When used in certain systems (e.g., for certain subterranean field operations), example embodiments can be designed to help such systems comply with certain standards and/or requirements. Examples of entities that set such standards and/or requirements can include, but are not limited to, the Society of Petroleum Engineers, the American Petroleum Institute (API), the International Standards Organization (ISO), and the Occupational Safety and Health Administration (OSHA). Also, as discussed above, example systems for evaluating securing systems for floating structures using virtual sensors can be used in hazardous environments, and so example systems for evaluating securing systems for floating structures using virtual sensors can be designed to comply with industry standards that apply to hazardous environments.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit number or a four-digit number, and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings can be capable of being included in one or more claims that correspond to such one or more particular drawings herein.

Example embodiments of systems for evaluating securing systems for floating structures using virtual sensors will be described more fully hereinafter with reference to the accompanying drawings, in which example embodiments of systems for evaluating securing systems for floating structures using virtual sensors are shown. Systems for evaluating securing systems for floating structures using virtual sensors may, however, be embodied in many different forms and should not be construed as limited to the example embodiments set forth herein. Rather, these example embodiments are provided so that this disclosure will be thorough and complete, and will fully convey the scope of systems for evaluating securing systems for floating structures using virtual sensors to those of ordinary skill in the art. Like, but not necessarily the same, elements (also sometimes called components) in the various figures are denoted by like reference numerals for consistency.

Terms such as "first", "second", "outer", "inner", "top", "bottom", "upper", "lower", "distal", "proximal", "on", and "within" are used merely to distinguish one component (or part of a component or state of a component) from another. This list of terms is not exclusive. Such terms are not meant to denote a preference or a particular orientation, and they are not meant to limit embodiments of systems for evaluating securing systems for floating structures using virtual sensors. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a field system 100 in which the performance of a securing system 175 for a floating structure 105 can be evaluated using virtual sensors. The system 100 in this case includes the floating structure 105 in the form of a semi-submersible platform that floats in a large and deep body of water 194. Part (e.g., the platform 107) of the floating structure 105 is above the water line 193, and the rest (e.g., the base 103) of the floating structure 105 is in the water 194 below the water line 193. The floating structure 105 in this case is used for subterranean field operations, in which exploration and production phases of the field operation are executed to extract subterranean resources (e.g., oil, natural gas, water, hydrogen gas) from and/or inject resources (e.g., carbon monoxide) into the subterranean formation 110. To accomplish this, a riser 197 is disposed between the floating structure 105 and the subsea surface 102, and field equipment (e.g., casing, tubing string) is disposed within the riser 197. At the bottom of the riser 197 at the subsea surface 102 is disposed a wellhead assembly 109.

The securing system 175 is used to help keep the floating structure 105 from deviating too far from its position along the water line 193 (in this case, in a horizontal direction). The securing system 175 can have any of a number of components that are arranged in any of a number of configurations. For example, in this case, the securing system 175 includes multiple (e.g., four, eight, eleven) mooring lines 170. Specifically, the securing system 175 includes six mooring lines 170: Mooring line 170-1, mooring line 170-2, mooring line 170-3, mooring line 170-4, mooring line 170-5, and mooring line 170-6. Each mooring line 170 in this case has one end attached to the base 103 of the floating structure 105, where the base 103 is disposed in the water 194), and the other end is anchored, using an anchor device 181, to the subterranean formation 110 below the subsea surface 102. One or more of the mooring lines 170 can be attached and/or positioned in any of a number of other ways relative to the floating structure 105 in order to secure the floating structure 105.

Specifically, in this case, mooring line 170-1 is anchored to the subterranean formation 110 using an anchor device (not shown). Further, mooring line 170-2 is anchored to the subterranean formation 110 using the anchor device 181-2. In addition, mooring line 170-3 is anchored to the subterranean formation 110 using the anchor device 181-3. Further, mooring line 170-4 is anchored to the subterranean formation 110 using the anchor device 181-4. In addition, mooring line 170-5 is anchored to the subterranean formation 110 using the anchor device 181-5. Further, mooring line 170-6 is anchored to the subterranean formation 110 using the anchor device 181-6.

In addition, or in the alternative, mooring lines 170 can be anchored to other objects and/or have different orientations compared to what is shown in FIG. 1. For example, one or more mooring lines 170 can be laid out on the subsea surface 102 and anchored to other mooring lines 170 that are attached to the floating structure 105. In any case, each mooring line 170 can be several thousand feet long. Each mooring line 170 can be a single continuous line or multiple shorter line segments that are coupled end-to-end to each other.

The wellhead assembly 109 is a combination of multiple components that are used to facilitate one or more operations (e.g., drilling, setting casing, cementing) in the wellbore in the subterranean formation 110. Examples of such components of the wellhead assembly 109 can include, but are not limited to, one or more valves, a blowout preventer (BOP) (and associated equipment), one or more accumulators, one or more connectors, one or more gauges, one or more sensor devices, one or more ports, one or more choke valves, one or more adaptors, and one or more hangers.

The field system 100 of FIG. 1 also includes multiple sensor devices. Each sensor device includes one or more sensors (e.g., pressure sensor, wind speed sensor, load cell, temperature sensor) that are configured to measure one or more parameters (e.g., temperature pressure, wind speed, wind direction, force, tension, flow rate) associated with one or more aspects of the field operation for which the floating structure 105 is used. For the field system 100 of FIG. 1, there are at least two general categories of sensor devices. Specifically, the field system 100 includes multiple metocean sensor devices 139 and multiple optional mooring line sensor devices 190. The metocean sensor devices 139 are configured to measure one or more parameters (e.g., wind speed, wind direction, current speed, current direction, heave, roll, pitch, heading, acceleration of surge, acceleration of sway, acceleration of heave, rate of pitch, rate of roll, rate of heading, static and dynamic six degrees of freedom (6-DoF) motions) related to metocean data. In other words, metocean sensor devices 139 can include motion sensors that measure one or more motions of the floating structure 105, sensors to measure meteorological data, and sensors that measure oceanic data. The mooring line sensor devices 190 are configured to measure one or more parameters (e.g., tension) associated with the mooring lines 170.

In this case, there are four metocean sensor devices 139. Metocean sensor device 139-1 is located at or near the platform 107 of the floating structure 105. Metocean sensor device 139-2 is located at the water line 193 on or near the riser 197. Metocean sensor device 139-3 is located on top of a derrick, crane, mast, or other object mounted on the platform 107 of the floating structure 105. Metocean sensor device 139-4 is located within the body of water 194 on or near the base 103 of the floating structure 105. In alternative embodiments, there can be any other number of metocean sensor devices 139, and the metocean sensor devices 139 can be located in the same and/or different locations to measure parameters associated with metocean data.

The parameters measured by the metocean sensor devices 139 can be associated with meteorological data and/or oceanic data. Such parameters can also be associated with movement of the floating structure 105. Examples of a sensor of a metocean sensor device 139 can include, but are not limited to, an anenometer, an accelerometer (e.g., a linear accelerometer), a gyroscope (e.g., a fiber optic gyroscope), a global positioning system (GPS), an air gap sensor, a flow sensor, a motion sensor. The metocean sensor devices 139 can be used for other purposes with respect to the field operation aside from evaluating the securing system 175. The metocean sensor devices 139 are generally inexpensive, readily available, and easily replaceable without requiring a suspension of the field operation. Example embodiments use the metocean data measured by the metocean sensor devices 139 to evaluate the securing system 175.

Also, in this example, there are six mooring line sensor devices 190. Mooring line sensor device 190-1 is located where the mooring line 170-1 is attached to the base 103 of the floating structure 105. Mooring line sensor device 190-2 is located where the mooring line 170-2 is attached to the base 103 of the floating structure 105. Mooring line sensor device 190-3 is located where the mooring line 170-3 is attached to the base 103 of the floating structure 105. Mooring line sensor device 190-4 is located where the mooring line 170-4 is attached to the base 103 of the floating structure 105. Mooring line sensor device 190-5 is located where the mooring line 170-5 is attached to the base 103 of the floating structure 105. Mooring line sensor device 190-6 is located where the mooring line 170-6 is attached to the base 103 of the floating structure 105.

A mooring line sensor device 190 can be located at or near any other part of a mooring line 170. For example, each mooring line sensor device 190 can include a load cell that is mounted on the base 103. In addition, or in the alternative, each mooring line 170 can have any other number (e.g., zero, two, four) of mooring line sensor devices 190 for monitoring one or more parameters associated with the mooring line 170.

The one or more parameters measured by each of the mooring line sensor devices 190 includes, at least, the amount of tension in a mooring line 170. Unfortunately, such mooring line sensor devices 190 are prone to fail after a relatively short period of time (e.g., 6 months, 1 year, 2 years) compared to the amount of time (e.g., 15 years, 20 years, 30 years) that a field operation can last. As a result, critical information about the integrity of the mooring lines 170 (or other aspects of the securing system 175) is unknown without example embodiments. While the mooring line sensor devices 190 can be replaced in the field, such replacement is difficult and can cause the field operation to be suspended while the replacement occurs. Example embodiments can operate regardless of whether the mooring line sensor devices 190 are part of the field system 100 and, if so, whether the mooring line sensor devices 190 are operating properly.

Figure 2:
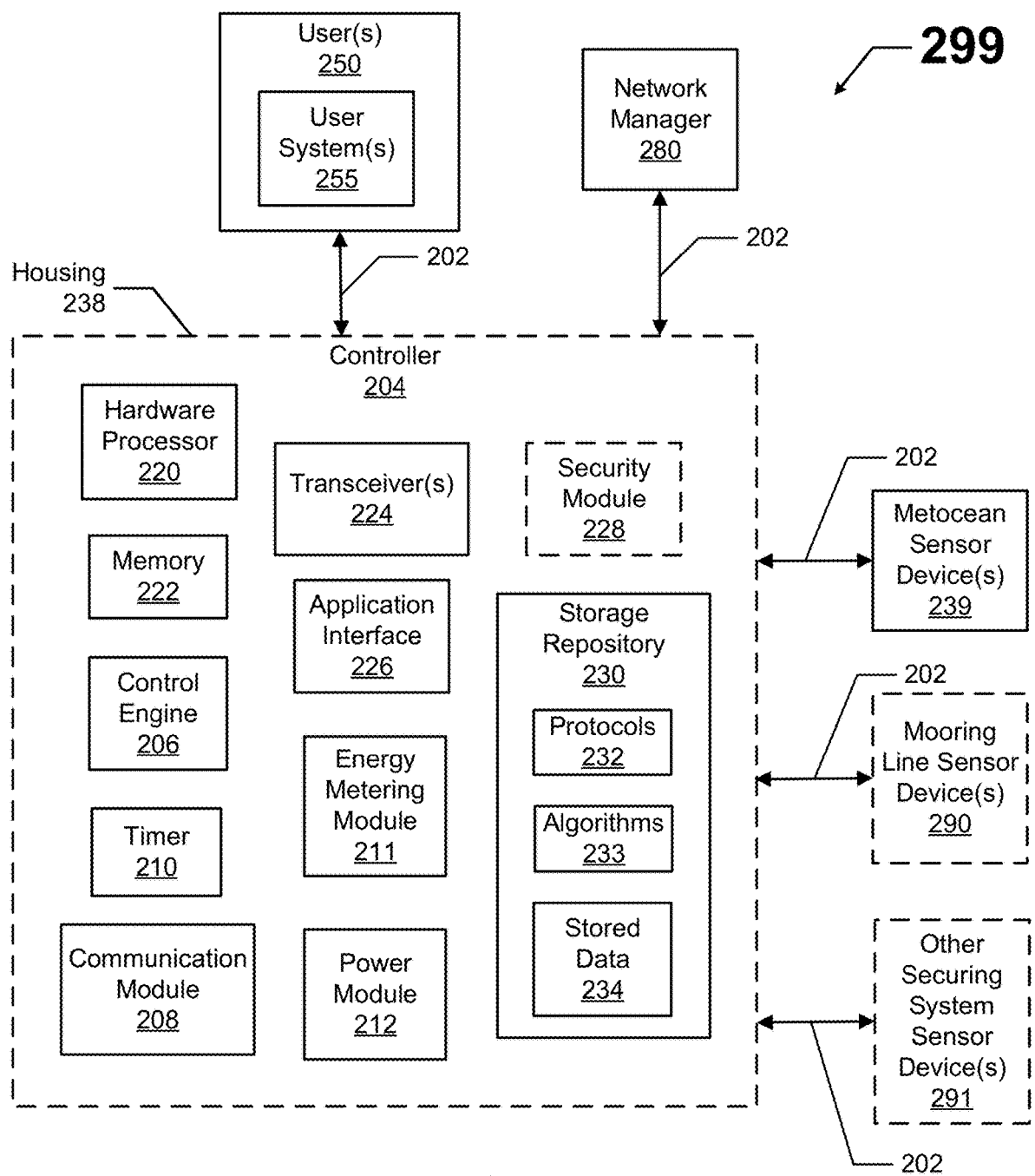
FIG. 2 shows a block diagram of a system for evaluating a securing system for a floating structure according to certain example embodiments.

FIG. 2 shows a block diagram of a system 299 for evaluating a securing system for a floating structure according to certain example embodiments. For example, the system 299 of FIG. 2 can be used to evaluate a securing system for a floating structure, such as the securing system 175 for the floating structure 105 of FIG. 1. Referring to FIGS. 1 and 2, the system 299 of FIG. 2 includes one or more users 250, a network manager 280, the one or more metocean sensor devices 239, a controller 204, one or more optional mooring line sensor devices 290, and one or more optional other securing system sensor devices 291. The controller 204 is communicably coupled to the metocean sensor devices 239, the optional mooring line sensor devices 290, the users 250 (including associated user systems 255), and the network manager 280 using communication links 202. The metocean sensor devices 239 and the optional mooring line sensor devices 290 of the system 299 of FIG. 2 are substantially the same as the metocean sensor devices 139 and the mooring line sensor devices 190 discussed above with respect to FIG. 1.

Each of the optional other securing system sensor devices 291 can include one or more of any type of sensor that measures one or more parameters associated with the securing system (e.g., securing system 175). Examples of types sensors of other securing system sensor devices 291 can include, but are not limited to, a temperature sensor, a flow rate sensor, a pressure sensor, a proximity sensor, an ultrasonic sensor, a seismic sensor, a magnetometer, and a gas detector. Examples of a parameter that is measured by a sensor of another securing system sensor device 291 can include, but are not limited to, a pressure, a flow rate, a temperature, an amount of vibration, and a level and/or composition of a gas. Example embodiments can operate regardless of whether the other securing system sensor devices 291 are part of a field system (e.g., field system 100) and, if so, whether the other securing system sensor devices 291 are operating properly.

As discussed above, the parameter or parameters measured by a sensor of a metocean sensor device 239 can be used to evaluate the securing system 175 of the floating structure 105 in real time during a field operation. In some cases, any of the sensor devices (e.g., a metocean sensor device 239, a mooring line sensor device 290, some other securing system sensor device 291) can include an energy storage device (e.g., a battery) to provide energy to allow the sensor device to operate. Any of the sensor devices can measure a parameter continuously, periodically, based on the occurrence of an event, based on a command received from the controller 204, and/or based on some other factor.

Each parameter measured by a sensor of any of the sensor devices is sent from that sensor device (e.g., a metocean sensor device 239) to the controller 204 using one or more communication links 202. Each communication link 202 can include wired (e.g., Class 1 electrical cables, Class 2 electrical cables, electrical connectors, power line carrier, DALI, RS485, UART, SPI, I2C) and/or wireless (e.g., Wi-Fi, visible light communication, cellular networking, visible light communication (VLC), 802.15.4 wireless, ZigBee, 4G cellular wireless, Bluetooth, WirelessHART, ISA100) technology.

In some cases, any of the sensor devices (e.g., a metocean sensor device 239, a mooring line sensor device 290, some other securing system sensor device 291) can be an integrated sensor. An integrated sensor has both the ability to sense and measure at least one parameter and the ability to communicate with another component (e.g., the controller 204, another sensor device). The communication capability of a sensor device that is an integrated sensor can include one or more communication devices that are configured to communicate with, for example, the controller 204 and/or another sensor device. For example, an integrated metocean sensor device 239 can include a sensor to measure wind speed and direction and a transceiver that sends and receives communication signals using one or more communication links 202.

Each integrated sensor device can use one or more of a number of communication protocols. This allows the integrated sensor device to communicate with one or more components of the system 299. The communication capability of an integrated sensor device can be dedicated to the sensor device and/or shared with the controller 204 and/or one or more of the other sensor devices.

If the communication capability of an integrated sensor device is dedicated to that sensor device, then the integrated sensor device can include one or more components (e.g., a transceiver, a communication module), or portions thereof, that are substantially similar to the corresponding components described below with respect to the controller 204. A sensor device can be integrated with another component (e.g., the floating structure 105) of a field system (e.g., field system 100). A sensor device can be located within a wall or housing of a component of a field system, disposed on a wall or housing of a component of a field system, or located outside of a wall or housing of a component of a field system. In some cases, a sensor device is a stand-alone component of the system 299.

In certain example embodiments, as discussed above, a sensor device (e.g., a metocean sensor device 239, a mooring line sensor device 290, some other securing system sensor device 291) can include an energy storage device (e.g., a battery) that is used to provide power, at least in part, to some or all of the sensor device. The optional energy storage device of the sensor module can operate at all times or when the sensor device is operating. Further, a sensor device can utilize or include one or more components (e.g., memory, storage repository, transceiver) found in the controller 204. In such a case, the controller 204 can provide the functionality of these components used by the sensor device. Alternatively, the sensor device can include, either on its own or in shared responsibility with the controller 204, one or more of the components of the controller 204. In such a case, the sensor device can correspond to a computer system as described below with regard to FIG. 3.

A user 250 may be any person that interacts with a field operation and/or the system 299. Examples of a user 250 may include, but are not limited to, a drilling engineer, a service engineer, a company representative, an inventory management system, an inventory manager, a roughneck, a labor scheduling system, a software developer, a contractor, and a manufacturer's representative. A user 250 can use a user system 255 (also sometimes called a user device 255 herein), which may include a display (e.g., a GUI).

A user system 255 of a user 750 interacts with (e.g., sends data to, receives data from) the controller 204 via the application interface 226 (described below). Examples of a user system 255 can include, but are not limited to, a cell phone with an app, a laptop computer, a handheld device, a smart watch, a desktop computer, and an electronic tablet. In some cases, a user 250 (including an associated user system 255) can also interact with a network manager 280 and/or one or more of the sensor devices (e.g., a metocean sensor device 239, a mooring line sensor device 290, some other securing system sensor device 291) in the system 299 using one or more communication links 202.

The network manager 280 is a device or component that controls all or a portion of a communication network that includes the controller 204 (including components thereof). The network manager 280 can be substantially similar to the controller 204. Alternatively, the network manager 280 can include one or more of a number of features in addition to, or altered from, the features of the controller 204 described below. As described herein, communication with the network manager 280 can include communicating with one or more other components (e.g., a user system 255) of the system 299. In such a case, the network manager 280 can facilitate such communication. There can be more than one network manager 280 and/or one or more portions of a network manager 280. The network manager 280 can also be called by other names in the art, including but not limited to a master controller, an enterprise manager, a system manager, and a system controller.

The controller 204, a user 250 (including an associated user system 255), and/or the network manager 280 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 204. Examples of such a system can include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 3.

Further, as discussed above, such a system can have corresponding software (e.g., user software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 299.

In certain example embodiments, the controller 204 of the system 299 is configured to receive the measurements made by each of the sensor devices (e.g., a metocean sensor device 239, a mooring line sensor device 290, some other securing system sensor device 291). The controller 204 is further configured to use the sensor measurements received from the metocean sensor devices 239 to evaluate the securing system 175 for the floating structure 105 during a field operation in real time. The controller 204 can also be configured to determine and communicate, in real time, a developing problem or failure of a component (e.g., a mooring line 170) of the securing system 175. The controller 204 can further be configured to employ a self-learning function by adjusting one or more algorithms 233 (discussed below) using recent measurements made by the metocean sensor devices 239.

The controller 204 can include one or more of a number of components. As shown in FIG. 2, such components, can include, but are not limited to, a control engine 206, a communication module 208, a timer 210, an energy metering module 211, a power module 212, a storage repository 230, a hardware processor 220, a memory 222, a transceiver 224, an application interface 226, and, optionally, a security module 228. The components of the controller 204 shown in FIG. 2 are not exhaustive. Any component of the example controller 204 can be discrete or combined with one or more other components of the controller 204. The controller 204 (or portions thereof) can be located indoors and/or outdoors with any of a number of types of environments (e.g., climate-controlled, humid, water-rated, corrosive, hazardous, office space). As an example, the controller 204 can be located on a platform (e.g., platform 107) of a floating structure (e.g., floating structure 105) used during a field operation. As another example, the controller 204 can be located in an office located remotely from the floating structure 105 and the field operation.

The storage repository 230 of the controller 204 can be a persistent storage device (or set of devices) that stores software and data used to assist the controller 204 in communicating with the user 250 (including an associated user system 255), one or more of the sensor devices (e.g., a metocean sensor device 239, a mooring line sensor device 290, some other securing system sensor device 291), and/or the network manager 280 within the system 299. In one or more example embodiments, the storage repository 230 stores one or more protocols 232, one or more algorithms 233, and stored data 234. The protocols 232 of the storage repository 230 can be any procedures (e.g., a series of method steps) and/or other similar operational procedures that the control engine 206 of the controller 204 follows based on certain conditions at a point in time.

An example of a protocol 232 is setting a number of times that a data point (as generated by the controller 204 using measurements from one of the metocean sensor devices 239 and one or more algorithms 233) falls outside a range of threshold values before determining that there is a problem with a component (e.g., a mooring line 170) of a securing system (e.g., securing system 175). Another example of a protocol 232 is a method for determining whether the measurements from certain metocean sensor devices 239 should be utilized at a point in time (e.g., based on deviations from historical measurements from those metocean sensor devices 239, based on a lack of impact on the output of an algorithm 233).

The protocols 232 can include any of a number of communication protocols that are used to send and/or receive data between the controller 204 and a user 250 (including an associated user system 255), one or more of the sensor devices (e.g., a metocean sensor device 239, a mooring line sensor device 290, some other securing system sensor device 291), and the network manager 280. A protocol 232 can also include a process for evaluating the securing system (e.g., securing system 175) of a floating structure (e.g., floating structure 105) in real time. One or more of the protocols 232 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the protocols 232 can provide a layer of security to the data transferred within the system 299.

The algorithms 233 of the storage repository 230 can be any formulas, mathematical models, forecasts, simulations, and/or other similar tools that the control engine 206 of the controller 204 uses to reach a computational conclusion. An example of one or more algorithms 233 can be or include a model that predicts a relationship between metocean data collected by the metocean sensor devices 239 and the condition of a securing system (e.g., securing system 170 (indicating portions thereof, such as individual mooring lines 170) over time. As another example, one or more algorithms 233 can be or include a model that evaluates, in real time, portions (e.g., individual mooring lines 170) of a securing system (e.g., securing system 175) using metocean data continuously (or substantially so) provided by the metocean sensor devices 239.

Algorithms 233 can be used to analyze past data, analyze current data, and/or perform forecasts. An algorithm 233 can be fixed or modified (e.g., by a user 250, by the control engine 206) over time. Modification of an algorithm 233 can be based on one or more of a number of factors, including but not limited to correction based on actual metocean data measured by one or more of the metocean sensor devices 239, input from a user 250 or associated user system 255, changes in a protocol 232, and changes in a related algorithm 233.

Stored data 234 of the storage repository 230 can be any data (e.g., material, thickness, length, manufacturing information) associated with a component (e.g., a mooring line 170) of a securing system (e.g., securing system 175) used during a field operation, any measurements made by the metocean sensor devices 239, threshold values, results of previously run or calculated algorithms 233, user preferences, and/or any other suitable data. Such data can be any type of data, including but not limited to historical data, current data, and forecasts. The stored data 234 can be associated with some measurement of time derived, for example, from the timer 210.

Examples of a storage repository 230 can include, but are not limited to, a database (or a number of databases), a file system, a hard drive, flash memory, some other form of solid state data storage, cloud-based storage, or any suitable combination thereof. The storage repository 230 can be located on multiple physical machines (e.g., the controller 204, the network manager 280, the cloud), each storing all or a portion of the protocols 232, the algorithms 233, and/or the stored data 234 according to some example embodiments. Each storage unit or device can be physically located in the same or in a different geographic location.

The storage repository 230 can be operatively connected to the control engine 206. In one or more example embodiments, the control engine 206 includes functionality to communicate with a user 250 (including an associated user system 255), one or more of the sensor devices (e.g., a metocean sensor device 239, a mooring line sensor device 290, some other securing system sensor device 291), and/or the network manager 280 in the system 299. More specifically, the control engine 206 sends information to and/or receives information from the storage repository 230 in order to communicate with a user 250 (including an associated user system 255), one or more of the sensor devices, and/or the network manager 280. As discussed below, the storage repository 230 can also be operatively connected to the communication module 208 in certain example embodiments.

In certain example embodiments, the control engine 206 of the controller 204 controls the operation of one or more components (e.g., the communication module 208, the timer 210, the transceiver 224) of the controller 204. For example, the control engine 206 can activate the communication module 208 when the communication module 208 is in "sleep" mode and when the communication module 208 is needed to send data received from another component (e.g., a user system 255 of a user 250, a metocean sensor device 239) in the system 299.

As another example, the control engine 206 can acquire the current time using the timer 210. As yet another example, the control engine 206 can direct the energy metering module 211 to measure and send power consumption information to the network manager 280. As still another example, the control engine 206 of the controller 204 can send measurements made by the sensor devices (e.g., the metocean sensor devices 239) and/or outputs of algorithms 233 to the network manager 280.

The control engine 206 can be configured to perform a number of functions that help the controller 204 evaluate a securing system (e.g., securing system 175) for a floating structure (e.g., floating structure 105) in real time during a field operation. As discussed above, the control engine 206 can execute any of the protocols 232 and/or the algorithms 233, using stored data 234 stored in the storage repository 230, to automatically evaluate a securing system in real time during a field operation. In certain example embodiments, the control engine 206 controls the frequency at which a metocean sensor device 239 measures a parameter resulting in metocean data during a field operation.

The control engine 206 can use one or more of the algorithms 233 and/or protocols 232 to predict a relationship between certain metocean data measured by the metocean sensor devices 239 and a component (e.g., a mooring line 170) of a securing system (e.g., securing system 175) over time. As another example, the control engine 206 can use one or more of the algorithms 233 and/or protocols 232 to assess/evaluate the metocean data (e.g., to determine that particular data points have unrealistic values, to identify frequent or sporadic zero values, to identify spurious values (e.g., spikes, dips), to identify uncorrected data, to identify "stuck" values). As another example, the control engine 206 can use one or more of the algorithms 233 and/or protocols 232 to discard or filter out, in real time, the particular data points that are deemed to be erroneous or otherwise unusable.

As still another example, the control engine 206 can use one or more of the algorithms 233 and/or protocols 232 to prepare (e.g., clean, normalize) raw metocean data so that such data is usable in evaluating a securing system (e.g., the securing system 175) for a floating structure (e.g., the floating structure 105). As yet another example, the control engine 206 can evaluate and, if necessary, adjust one or more of the algorithms 233 and/or protocols 232 to more accurately evaluate a securing system for a floating structure during a field operation.

In certain example embodiments, the control engine 206 of the controller 204 can use one or more of the algorithms 233 and/or protocols 232 to verify the functionality of one or more of the sensor devices (e.g., a metocean sensor device 239, a mooring line sensor device 290, some other securing system sensor device 291), either before or during a field operation. This functionality of a sensor device can be directed to a specific component (e.g., a sensor) of the sensor device or cover a full spectrum of the functional capability of the sensor device. In performing this function, the control engine 206 can perform calibrations and/or establish settings of a sensor device or one or more of its components. For example, the control engine 206 can calibrate a sensor device that measures wind speed. As another example, the control engine 206 can test and upload settings (e.g., detection settings, actions to take upon detecting a certain parameter that exceeds or falls below a threshold value, hold time, actions to take when failing to detect a parameter) with respect to a sensor device that measures a parameter associated with metocean data.

The control engine 206 of the controller 204, through the use of one or more protocols 232 and/or algorithms 233, can implement machine learning as a way to evolve over time with new data and associated changes that can result from the new data. The control engine 206 can use, for example, supervised learning, unsupervised learning, semi-supervised learning, and/or reinforcement learning, as those terms are known in the art of machine learning. In this case, these types of machine learning are effective with sufficient data (e.g., measurements from sensor devices, such as the metocean sensor devices 239) and use of algorithms 233 that automatically build mathematical models using sample data—also known as "training data".

The learning algorithms 233 that can be used and trained by the control engine 206 can include, but are not limited to, instance-based learning algorithms, artificial neural network algorithms, deep learning algorithms, and ensemble algorithms. Instance-based learning algorithms typically build up a database of example data and compare new data to the database using a similarity measure in order to find the best match and make a prediction. For this reason, instance-based methods are also called winner-take-all methods and memory-based learning. Focus is put on the representation of the stored instances and similarity measures used between instances. Instance-based algorithms can be computationally expensive for very large datasets since they save all training instances/data points and are sensitive to data noise.

Artificial neural networks are fairly similar to the human brain. They are made up of artificial neurons, take in multiple inputs, and produce specific outputs. Artificial neural networks are an enormous subfield comprised of a large number of neural network architectures and hundreds of algorithms and variations for different types of problems. Artificial neural networks are the biologically inspired computational simulations for certain specific tasks like clustering, classification, or pattern recognition.

Deep learning algorithms are a modern update to artificial neural networks by building much larger and more complex neural networks. With deep learning, many methods are applied to very large datasets. Various architectures can be applied for deep learning algorithms. Deep learning has a high computational cost because much of its development requires advanced processing, storage hardware, and ML platforms/APIs.

Ensemble algorithm methods are models composed of multiple weaker models that are independently trained and whose predictions are combined in some way to make the overall prediction. Various combination techniques (e.g., averaging, max voting, bagging/bootstrapping (sampling subsets of original complete dataset), boosting) have been applied. Unlike other standard ensemble methods where models are trained in isolation, the boosting technique employs an iterative approach, training models in succession, with each new model being trained to correct the errors made by the previous ones. Models are added sequentially until no further improvements can be made.

The control engine 206 can cause control, communication, and/or other similar signals to be generated and sent to a user 250 (including an associated user system 255), one or more of the sensor devices (e.g., a metocean sensor device 239, a mooring line sensor device 290, some other securing system sensor device 291), and/or the network manager 280. Similarly, the control engine 206 can execute certain instructions based on control, communication, and/or other similar signals received from a user 250 (including an associated user system 255), one or more of the sensor devices, and/or the network manager 280. The control engine 206 can control each sensor device automatically (for example, based on one or more protocols 232 or algorithms 233 stored in the storage repository 230) and/or based on control, communication, and/or other similar signals received from another device or component of the system 299 through a communication link 202.

In certain embodiments, the control engine 206 of the controller 204 can communicate with one or more components of a system external to the system 299 in furtherance of evaluating a securing system for a floating structure in real time during a field operation. For example, the control engine 206 can interact with an inventory management system by ordering a replacement component (e.g., a metocean sensor device 239) of the system 299 when the control engine 206 has determined that the component has failed or is about to fail. As another example, the control engine 206 can interact with a logistics system by scheduling one or more modes of transportation (e.g., truck, train, helicopter, boat) to get a replacement component to the site of the field operation so that the component can be replaced. In this way, the controller 204 is capable of performing a number of functions beyond what is performed within the system 299 shown in FIG. 2.

A user 250 (including an associated user system 255), one or more of the sensor devices (e.g., a metocean sensor device 239, a mooring line sensor device 290, some other securing system sensor device 291), and/or the network manager 280 can interact with the controller 204 using the application interface 226 in accordance with one or more example embodiments. Specifically, the application interface 226 of the controller 204 receives data (e.g., information, communications, instructions, updates to firmware) from and sends data (e.g., information, communications, instructions) to a user 250 (including an associated user system 255), one or more of the sensor devices, and/or the network manager 280. A user 250 (including an associated user system 255), one or more of the sensor devices, and/or the network manager 280 can include an interface to receive data from and send data to the controller 204 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

In some cases, the application interface 226 of the controller 204 can enable the control engine 206 to communicate with one or more components (e.g., a metocean sensor device 239, the network manager 280) of the system 299 using a particular interface. For example, if the controller 204 operates under IEC Standard 62386, then the controller 204 can have a serial communication interface that will transfer data (e.g., stored data 234) measured by one or more of the sensor devices 299. In such a case, a user system 255 can also include a serial interface to enable communication with the controller 204. Such an interface can operate in conjunction with, or independently of, the protocols 232 used to communicate between the controller 204 and a user 250 (including an associated user system 255), one or more of the sensor devices (e.g., a metocean sensor device 239, a mooring line sensor device 290, some other securing system sensor device 291), and/or, the network manager 280.

The control engine 2b06 (or other components of the controller 204) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit (I²C), and a pulse width modulator (PWM).

The communication module 208 of the controller 204 determines and implements the communication protocol (e.g., from the protocols 232 of the storage repository 230) that is used when the control engine 206 communicates with (e.g., sends signals to, receives signals from) a user 250 (including an associated user system 255), one or more of the sensor devices, and/or the network manager 280. In some cases, the communication module 208 accesses the stored data 234 to determine which communication protocol is used to communicate with another component of the system 299. In addition, the communication module 208 can interpret the communication protocol of a communication received by the controller 204 so that the control engine 206 can interpret the communication.

The communication module 208 can send and receive data between the network manager 280, the sensor devices (e.g., a metocean sensor device 239, a mooring line sensor device 290, some other securing system sensor device 291), and/or the users 250 (including associated user systems 255) and the controller 204. The communication module 208 can send and/or receive data in a given format that follows a particular protocol 232. The control engine 206 can interpret the data packet received from the communication module 208 using the protocol 232 information stored in the storage repository 230. The control engine 206 can also facilitate the data transfer between one or more sensor devices and the network manager 280 and/or a user 250 (including an associated user system 255) by converting the data into a format understood by the communication module 208.

The communication module 208 can send data (e.g., protocols 232, algorithms 233, stored data 234, operational information, threshold values, results of algorithms 233) directly to and/or retrieve data directly from the storage repository 230. Alternatively, the control engine 206 can facilitate the transfer of data between the communication module 208 and the storage repository 230. The communication module 208 can also provide encryption to data that is sent by the controller 204 and decryption to data that is received by the controller 204. The communication module 208 can also provide one or more of a number of other services with respect to data sent from and received by the controller 204. Such services can include, but are not limited to, data packet routing information and procedures to follow in the event of data interruption.

The timer 210 of the controller 204 can track clock time, intervals of time, an amount of time, and/or any other measure of time. The timer 210 can also count the number of occurrences of an event, whether with or without respect to time. Alternatively, the control engine 206 can perform the counting function. The timer 210 is able to track multiple time measurements concurrently. The timer 210 can track time periods based on an instruction received from the control engine 206, based on an instruction received from the user 250 (or an associated user system 255), based on an instruction programmed in the software for the controller 204, based on some other condition or from some other component, or from any combination thereof.

The timer 210 can be configured to track time when there is no power delivered to the controller 204 (e.g., the power module 212 malfunctions) using, for example, a super capacitor or a battery backup. In such a case, when there is a resumption of power delivery to the controller 204, the timer 210 can communicate any aspect of time to the controller 204. In such a case, the timer 210 can include one or more of a number of components (e.g., a super capacitor, an integrated circuit) to perform these functions.

The energy metering module 211 of the controller 204 measures one or more components of energy (e.g., electrical current, electrical voltage, resistance, VARs, watts) at one or more points within the scope of the controller 204. The energy metering module 211 can include any of a number of measuring devices and related devices, including but not limited to a voltmeter, an infrared detector, an ammeter, a power meter, an ohmmeter, a current transformer, a potential transformer, a sensing resistor, and electrical wiring. The energy metering module 211 can measure a component of energy continuously, periodically, based on the occurrence of an event, based on a command received from the control engine 206, and/or based on some other factor. The energy metering module 211 can be part of, or separate from, the sensor devices (e.g., the metocean sensor devices 239).

The power module 212 of the controller 204 provides power to one or more other components (e.g., timer 210, control engine 206) of the controller 204. The power module 212 can include one or more of a number of single or multiple discrete components (e.g., transistor, diode, resistor), and/or a microprocessor. The power module 212 may include a printed circuit board, upon which the microprocessor and/or one or more discrete components are positioned. In some cases, the power module 212 can include one or more components that allow the power module 212 to measure one or more elements of power (e.g., voltage, current) that is delivered to and/or sent from the power module 212. Alternatively, the energy metering module 211 can measure one or more elements of power that flows into, out of, and/or within the power module 212.

The power module 212 can include one or more components (e.g., a transformer, a diode bridge, an inverter, a converter) that receives power (for example, through an electrical cable) from a source external to the controller 204 and generates power of a type (e.g., alternating current, direct current) and level (e.g., 12V, 24V, 120V) that can be used by the other components of the controller 204. The power module 212 can use a closed control loop to maintain a preconfigured voltage or current with a tight tolerance at the output. The power module 212 can also protect the rest of the electronics (e.g., hardware processor 220, transceiver 224) of the controller 204 from surges generated in the line.

In addition, or in the alternative, the power module 212 can be or include a source of power in itself to provide signals to the other components of the controller 204. For example, the power module 212 can be or include a battery. As another example, the power module 212 can be or include a localized photovoltaic power system. The power module 212 can also have sufficient isolation in the associated components of the power module 212 (e.g., transformers, opto-couplers, current and voltage limiting devices) so that the power module 212 is certified to provide power to an intrinsically safe circuit.

In certain example embodiments, the power module 212 of the controller 204 can also provide power and/or control signals, directly or indirectly, to one or more of the sensor devices (e.g., a metocean sensor device 239, a mooring line sensor device 290, some other securing system sensor device 291). In such a case, the control engine 206 can direct the power generated by the power module 212 to the sensor devices. In this way, power can be conserved by sending power to the sensor devices when the sensor devices need power, as determined by the control engine 206.

The hardware processor 220 of the controller 204 executes software, algorithms (algorithms 233), and firmware in accordance with one or more example embodiments. Specifically, the hardware processor 220 can execute software on the control engine 206 or any other portion of the controller 204, as well as software used by a user 250 (including an associated user system 255), one or more of the sensor devices (e.g., a metocean sensor device 239, a mooring line sensor device 290, some other securing system sensor device 291), and/or the network manager 280. The hardware processor 220 can be an integrated circuit, a central processing unit, a multi-core processing chip, SoC, a multi-chip module including multiple multi-core processing chips, or other hardware processor in one or more example embodiments. The hardware processor 220 is known by other names, including but not limited to a computer processor, a microprocessor, a microcontroller, and a multi-core processor.

In one or more example embodiments, the hardware processor 220 executes software instructions stored in memory 222. The memory 222 includes one or more cache memories, main memory, and/or any other suitable type of memory. The memory 222 can include volatile and/or non-volatile memory. The memory 222 is discretely located within the controller 204 relative to the hardware processor 220 according to some example embodiments. In certain configurations, the memory 222 can be integrated with the hardware processor 220.

In certain example embodiments, the controller 204 does not include a hardware processor 220. In such a case, the controller 204 can include, as an example, one or more field programmable gate arrays (FPGA), one or more integrated-gate bipolar transistors (IGBTs), one or more complex programmable logic devices (CPLDs), programmable array logics (PALs), one or more digital signal processors (DSPs), and/or one or more integrated circuits (ICs). Using FPGAs, IGBTs, CPLDs, PALs, DSPs, ICs, and/or other similar devices known in the art allows the controller 204 (or portions thereof) to be programmable and function according to certain logic rules and thresholds without the use of a hardware processor. Alternatively, FPGAs, IGBTs, CPLDs, PALs, DSPs, ICs, and/or similar devices can be used in conjunction with one or more hardware processors 220.

The transceiver 224 of the controller 204 can send and/or receive control and/or communication signals. Specifically, the transceiver 224 can be used to transfer data between the controller 204 and a user 250 (including an associated user system 255), one or more of the sensor devices (e.g., a metocean sensor device 239, a mooring line sensor device 290, some other securing system sensor device 291), and/or the network manager 280. The transceiver 224 can use wired and/or wireless technology. The transceiver 224 can be configured in such a way that the control and/or communication signals sent and/or received by the transceiver 224 can be received and/or sent by another transceiver that is part of a user 250 (including an associated user system 255), one or more of the sensor devices, and/or, the network manager 280. The transceiver 224 can use any of a number of signal types, including but not limited to radio frequency signals.

When the transceiver 224 uses wireless technology, any type of wireless technology can be used by the transceiver 224 in sending and receiving signals. Such wireless technology can include, but is not limited to, Wi-Fi, visible light communication (VLC), cellular networking, 802.15.4 wireless, ZigBee, 4G cellular wireless, BLE, and Bluetooth. The transceiver 224 can use one or more of any number of suitable communication protocols (e.g., ISA100, HART) when sending and/or receiving signals. Such communication protocols can be stored in the protocols 232 of the storage repository 230. Further, any transceiver information for a user 250 (including an associated user system 255), one or more of the sensor devices (e.g., a metocean sensor device 239, a mooring line sensor device 290, some other securing system sensor device 291), and/or the network manager 280 can be part of the stored data 234 (or similar areas) of the storage repository 230.

Optionally, in one or more example embodiments, the security module 228 secures interactions between the controller 204, a user 250 (including an associated user system 255), one or more of the sensor devices (e.g., a metocean sensor device 239, a mooring line sensor device 290, some other securing system sensor device 291), and/or the network manager 280. More specifically, the security module 228 authenticates communication from software based on security keys verifying the identity of the source of the communication. For example, user software may be associated with a security key enabling the software of a user system 255 of a user 250 to interact with the controller 204 and/or the sensor devices. Further, the security module 228 can restrict receipt of information, requests for information, and/or access to information in some example embodiments.

Figure 3:
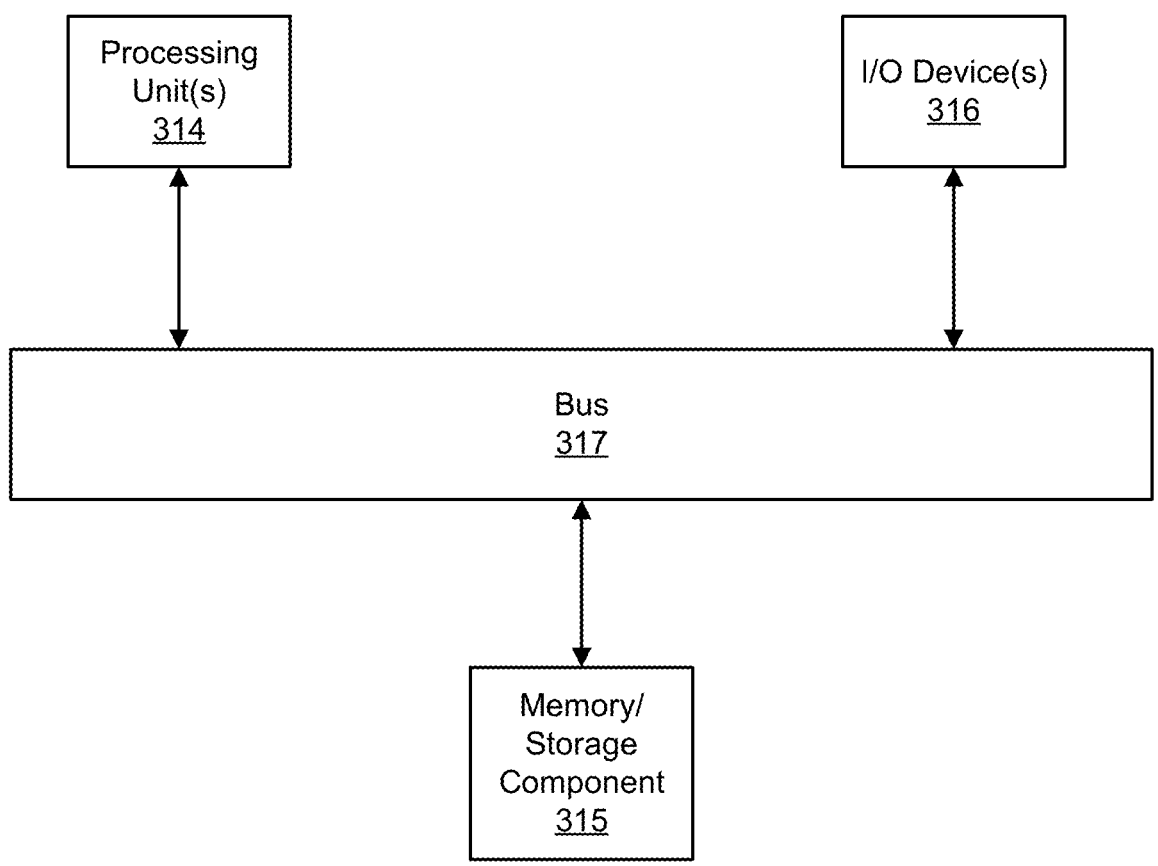
FIG. 3 shows a diagram of a computing system according to certain example embodiments.

FIG. 3 shows a computing device 318 according to certain example embodiments. FIG. 3 illustrates one embodiment of a computing device 318 that implements one or more of the various techniques described herein, and which is representative, in whole or in part, of the elements described herein pursuant to certain exemplary embodiments. For example, computing device 318 can be implemented in the form of the controller 204 (which can include a hardware processor, memory, and a storage repository, among other components) of FIG. 2. Computing device 318 is one example of a computing device and is not intended to suggest any limitation as to scope of use or functionality of the computing device and/or its possible architectures. Neither should computing device 318 be interpreted as having any dependency or requirement relating to any one or combination of components illustrated in the example computing device 318.

Computing device 318 includes one or more processors or processing units 314, one or more memory/storage components 315, one or more input/output (I/O) devices 316, and a bus 317 that allows the various components and devices to communicate with one another. Bus 317 represents one or more of any of several types of bus structures, including a memory bus or memory controller, a peripheral bus, an accelerated graphics port, and a processor or local bus using any of a variety of bus architectures. Bus 317 includes wired and/or wireless buses.

Memory/storage component 315 represents one or more computer storage media. Memory/storage component 315 includes volatile media (such as random access memory (RAM)) and/or nonvolatile media (such as read only memory (ROM), flash memory, optical disks, magnetic disks, and so forth). Memory/storage component 315 includes fixed media (e.g., RAM, ROM, a fixed hard drive, etc.) as well as removable media (e.g., a Flash memory drive, a removable hard drive, an optical disk, and so forth).

One or more I/O devices 316 allow a customer, utility, or other user to enter commands and information to computing device 318, and also allow information to be presented to the customer, utility, or other user and/or other components or devices. Examples of input devices include, but are not limited to, a keyboard, a cursor control device (e.g., a mouse), a microphone, a touchscreen, and a scanner.

Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 318 is connected to a network (not shown) (e.g., a LAN, a WAN such as the Internet, cloud, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 318 includes at least the minimal processing, input, and/or output means necessary to practice one or more embodiments.

Further, those skilled in the art will appreciate that one or more elements of the aforementioned computer device 318 is located at a remote location and connected to the other elements over a network in certain exemplary embodiments. Further, one or more embodiments is implemented on a distributed system having one or more nodes, where each portion of the implementation (e.g., control engine 206) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 4:
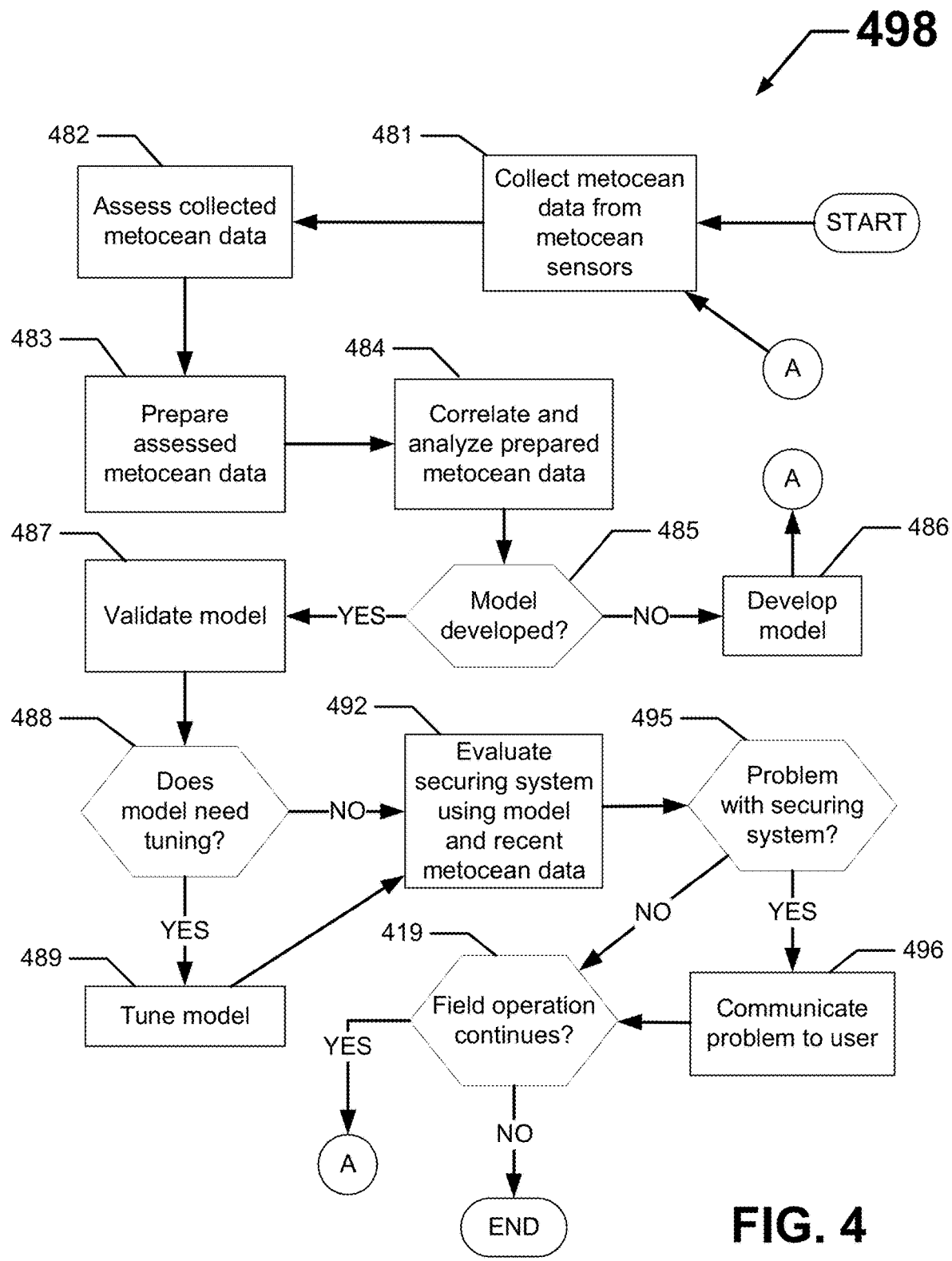
FIG. 4 shows a flowchart of a method for evaluating a securing system for a floating structure during field operations according to certain example embodiments.

FIG. 4 shows a flowchart 498 of a method for evaluating a securing system for a floating structure during field operations according to certain example embodiments. While the various steps in this flowchart 498 are presented sequentially, one of ordinary skill will appreciate that some or all of the steps may be executed in different orders, may be combined or omitted, and some or all of the steps may be executed in parallel. Further, in one or more of the example embodiments, one or more of the steps shown in this example method may be omitted, repeated, and/or performed in a different order.

In addition, a person of ordinary skill in the art will appreciate that additional steps not shown in FIG. 4 may be included in performing this method. Accordingly, the specific arrangement of steps should not be construed as limiting the scope. Further, a particular computing device, such as the computing device discussed above with respect to FIG. 3, can be used to perform one or more of the steps for the methods shown in FIG. 4 in certain example embodiments. Any of the functions performed below by the controller 204 can involve the use of one or more protocols 232, one or more algorithms 233, and/or stored data 234.

The method shown in FIG. 4 is merely an example that can be performed by using an example system described herein. In other words, systems for evaluating a securing system (e.g., securing system 175) for a floating structure (e.g., floating structure 105) in real time during a field operation can perform other functions using other methods in addition to and/or aside from those shown in FIG. 4. Referring to FIGS. 1 through 4, the method shown in the flowchart 498 of FIG. 4 begins at the START step and proceeds to step 481, where metocean data is collected from metocean sensors 239. The metocean data can be collected from the metocean sensors 239 by the controller 204 using one.or more protocols 232 and/or algorithms 233. The metocean data can be collected at any interval (e.g., instantaneously, continuously, periodically, randomly). The metocean data can cover a period of time (e.g., an hour, a day, a week, a month, a year). In addition to collecting metocean data, other types of data (e.g., data received from mooring line sensor devices 290, data received from other securing system sensor devices 291) can also be collected in this step 481.

The metocean data can include, but is not limited to, GPS data (e.g., northing, easting) for the position of the floating structure (e.g., floating structure 105), data (e.g., roll, pitch, heave, heading, accelerations of surge, sway, heave, rate of pitch, rate of roll, rate of heading) related to motion of the floating structure (e.g., floating structure 105), and/or data (e.g., current, waves, high tide, low tide) related to motion of the body of water (e.g., body of water 194) in which the floating structure is located.

Figure 5:
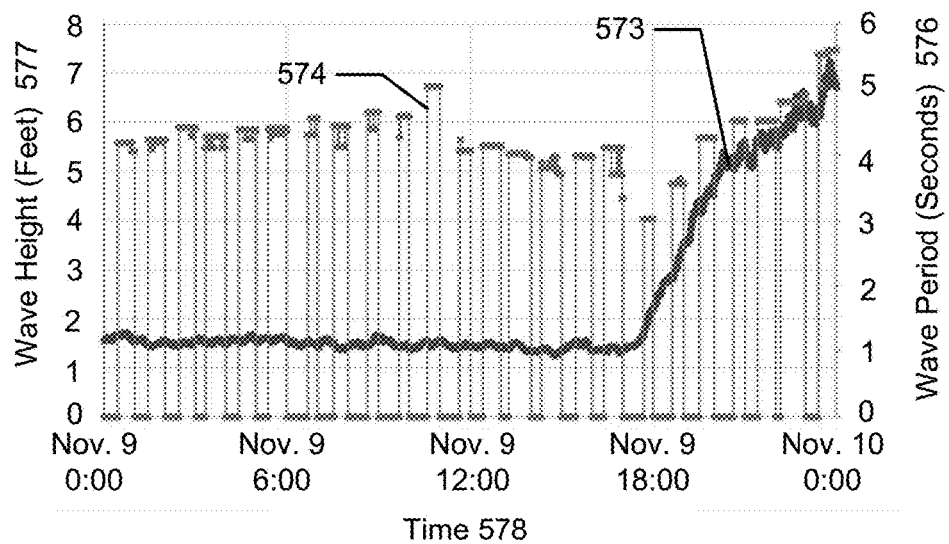
FIG. 5 shows a graph of metocean data received from metocean sensor devices over a period of time according to certain example embodiments.
Figure 6:
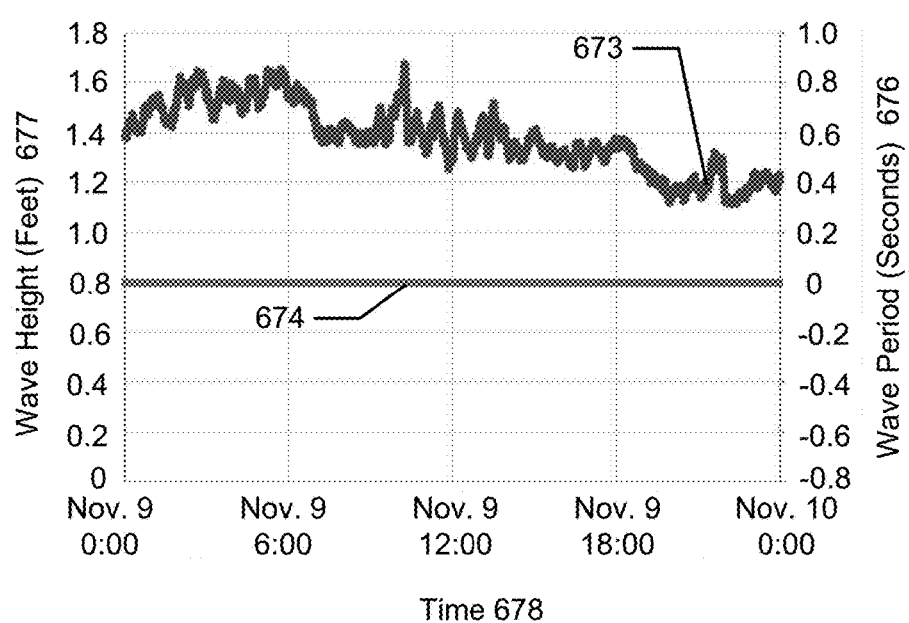
FIG. 6 shows another graph of metocean data received from metocean sensor devices over a period of time according to certain example embodiments.
Figure 7:
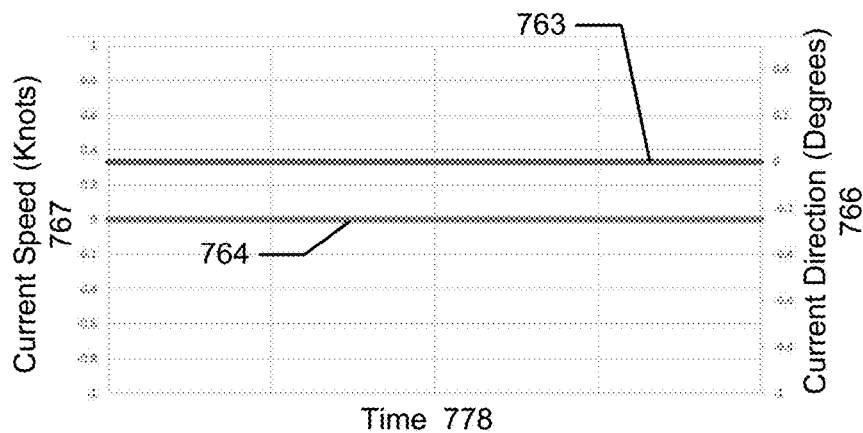
FIG. 7 shows yet another graph of metocean data received from metocean sensor devices over a period of time according to certain example embodiments.
Figure 8:
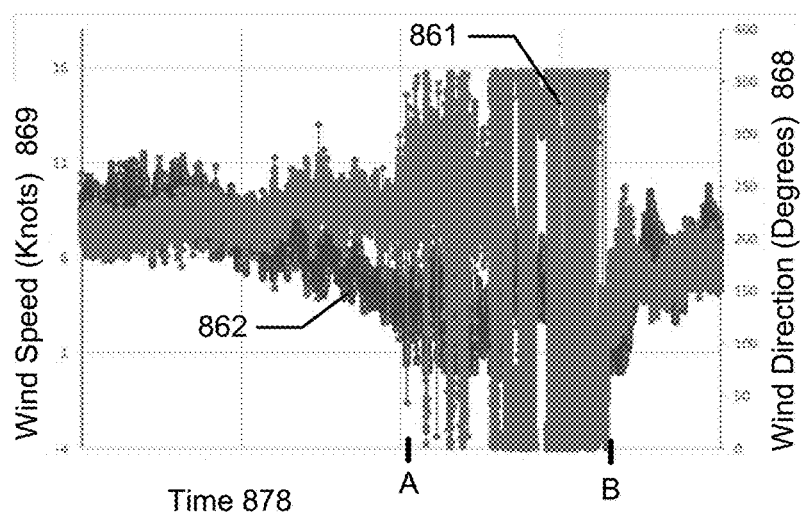
FIG. 8 shows still another graph of metocean data received from metocean sensor devices over a period of time according to certain example embodiments.

In step 482, the collected metocean data is assessed. In certain example embodiments, the metocean data is assessed by the controller 204 using one or more protocols 233 and/or algorithms 232. Assessing the metocean data can include determining the quality of the metocean data. For example, the controller 204 can determine whether the metocean data has an unrealistic value. As other examples, as shown in FIGS. 5 and 6, the controller 204 can determine whether there are erroneous or frequent zero readings within the metocean data. As yet another example, the controller 204 can determine whether metocean data is unrealistic (e.g., unchanging) for an extended period of time, as shown in FIG. 7. As still another example, the controller 204 can determine whether metocean data (e.g., the wind direction) is spurious, as shown in FIG. 8. As yet another example, the controller 204 can determine whether any GPS data within the metocean data is uncorrected.

As still another example, the controller 204 can determine whether there are isolated spikes, isolated dips, or other abnormal readings of the metocean data. As yet another example, the controller 204 can determine when GPS data is uncorrected. As still another example, when multiple GPS sources are used, the controller 204 can determine when the data from one GPS source is compensated better or worse than the data from another GPS source. In addition to assessing metocean data, other types of data (e.g., data received from mooring line sensor devices 290, data received from other securing system sensor devices 291) can also be assessed in this step 482.

FIG. 5 shows a graph 579 of metocean data received from metocean sensor devices 239 over a period of time 578 according to certain example embodiments. FIG. 6 shows another graph 679 of metocean data received from metocean sensor devices 239 over a period of time 678 according to certain example embodiments. FIG. 7 shows yet another graph 779 of metocean data received from metocean sensor devices 239 over a period of time 778 according to certain example embodiments. FIG. 8 shows still another graph 879 of metocean data received from metocean sensor devices 239 over a period of time 878 according to certain example embodiments.

Referring to FIGS. 1 through 8, the graph 579 of FIG. 5 shows plots of wave height 573 and wave period 574 over time 578 (in this case, 24 consecutive hours). The wave height 573 is shown in terms of feet 577, and the wave period 574 is shown in terms of seconds 576. While the measurements of the wave height 573 appear to be smooth and realistic, the measurements of the wave period 574 are very sporadic, with numerous short periods of time that show zero readings, which are erroneous values for a wave period. These erroneous values can be identified by the controller 204.

The graph 679 of FIG. 6 shows plots of wave height 673 and wave period 674 over time 678 (in this case, 24 consecutive hours). The wave height 673 is shown in terms of feet 677, and the wave period 674 is shown in terms of seconds 676. While the measurements of the wave height 673 appear to be smooth and realistic, the measurements of the wave period 674 are stuck at zero, which are unrealistic values for a wave period over a 24 hour period. These zero values can be identified by the controller 204.

The graph 779 of FIG. 7 shows plots of current direction 763 and current speed 764 over time 778 (in this case, 24 consecutive hours). The current direction 763 is shown in terms of knots 767, and the current speed 764 is shown in terms of degrees 766. The measurements of both the current direction 763 and the current speed 764 are stuck at zero, which are unrealistic values for a 24 hour period. These zero values can be identified as unrealistic by the controller 204.

The graph 879 of FIG. 8 shows plots of wind direction 861 and wind speed 862 over time 878 (in this case, 24 consecutive hours). The wind direction 861 is shown in terms of degrees 868, and the wind speed 862 is shown in terms of knots 869. While the measurements of the wind speed 862 appear to be realistic, the measurements of the wind direction 861 for the time 878 between points A and B are very spurious. These spurious values can be identified by the controller 204 as erroneous.

In step 483, the metocean data is prepared. In certain example embodiments, the metocean data is prepared by the controller 204 using one or more protocols 232 and/or algorithms 233. The metocean data can be prepared in one or more of any of a number of ways. For example, uncorrected GPS data can be removed. As another example, constant measurements made by a sensor device (e.g., a metocean sensor device 239) can be removed. As yet another example, zero readings of metocean data can be removed. As still another example, spikes, dips, and other outliers of data measurements made by a sensor device (e.g., a metocean sensor device 239) can be removed.

Preparing metocean data can be a learned experience. Put another way, the controller 204 can establish over time (e.g., through self-learning, based on inputs from a user 250) what metocean data should be removed. For example, the controller 204, using one or more protocols 232 and/or algorithms 233, determines what data should be considered a spike, dip, or other type of outlier relative to the other data received from a particular sensor device (e.g., a metocean sensor device 239). As more specific examples, the controller 204 can use simple moving averaging, Z-score method for gaussian distribution, sophisticated probabilistic analysis, binary decision tree methods, and/or methods based on the statistical quartile analysis (e.g., tuning and sensitivity checks are performed on sample datasets in the range of 0.01%~0.1% quartile acceptance criteria). Sometimes, the removal of outlier data can lead to inadvertent removal of normal maxima and minima in a data series.

Figure 9A:
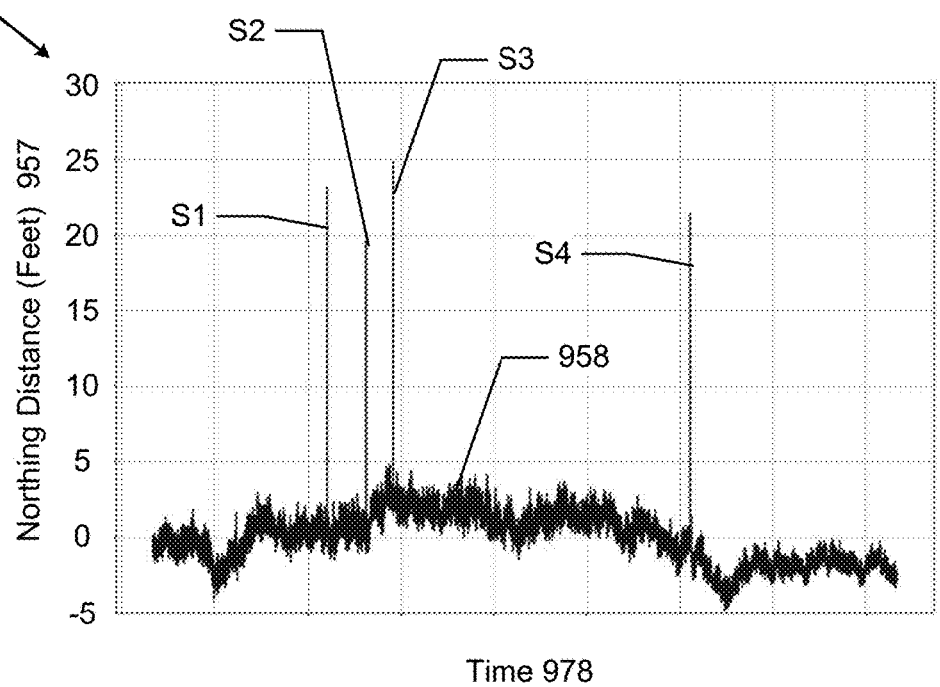
FIG. 9A shows a graph of raw metocean data over a period of time.
Figure 9B:
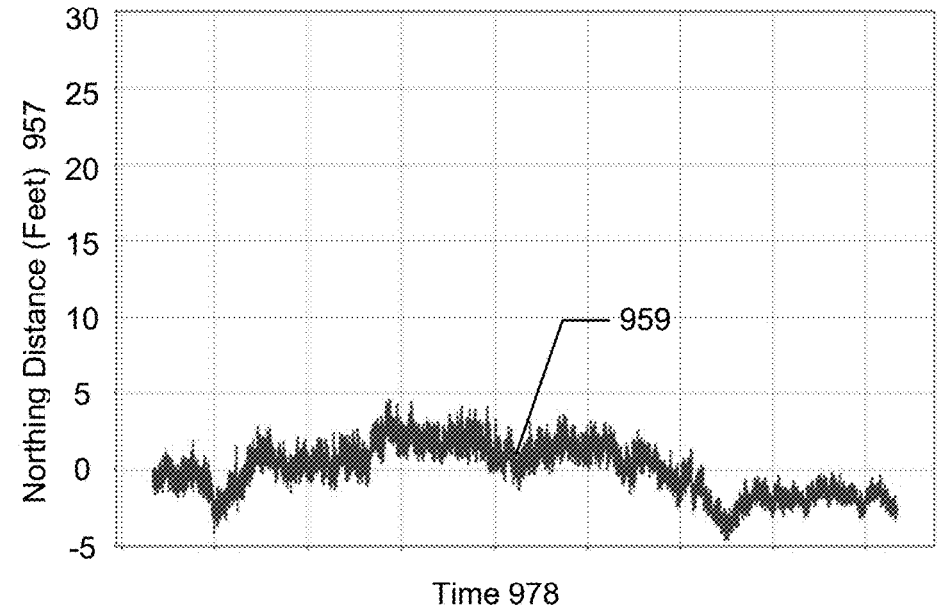
FIG. 9B shows a graph of prepared metocean data from FIG. 9A over the period of time according to certain example embodiments.

An example of outlier data being removed from a data set is shown with respect to FIGS. 9A and 9B. Specifically, FIG. 9A shows a graph 979-1 of raw metocean data over a period of time 978, and FIG. 9B shows a graph 979-2 of the prepared metocean data from FIG. 9A over the period of time 978 according to certain example embodiments. Referring to FIGS. 1 through 9B, in the graph 979-1 of FIG. 9A, the plot 958 of raw data for northing distance 957 is measured in feet over time 978 by a metocean sensor device 239. While most of the data seems to be normal or acceptable, there are four spikes (spike S1, spike S2, spike S3, and spike S4) that show momentary excursions of 20-25 feet. The controller 204 in this case determines that spike S1, spike S2, spike S3, and spike S4 represent erroneous data points, and so should not be used in evaluating the securing system (e.g., securing system 175) for a floating structure (e.g., floating structure 105).

As a result, as shown in the graph 979-2 of FIG. 9B, the controller 204 replaces spike S1, spike S2, spike S3, and spike S4 with values that are equal to the average of what immediately preceeds and proceeds the respective spike. The result is the plot 959 of processed data for northing distance 957 measured in feet over time 978, as shown in FIG. 9B. The processed data shown by the plot 959 in FIG. 9B is used by the controller 204 in this method 498 to evaluate a securing system for a floating structure. In alternative embodiments, the controller 204 can remove the spikes without replacing the data points with other values.

Figure 10A:
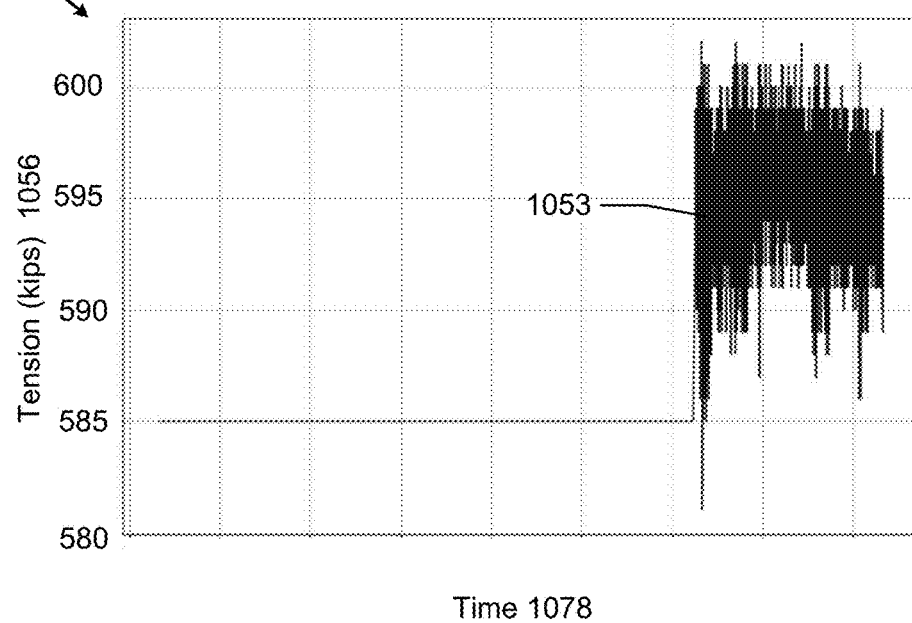
FIG. 10A shows a graph of raw mooring line data over a period of time.
Figure 10B:
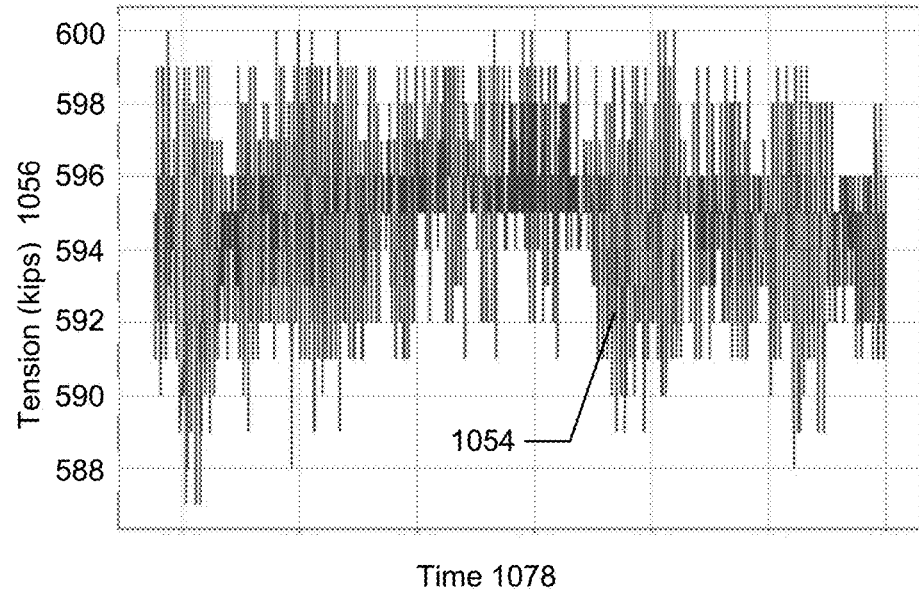
FIG. 10B shows a graph of prepared mooring line data from FIG. 10A over the period of time according to certain example embodiments.

Another example of outlier data being removed from a data set is shown with respect to FIGS. 10A and 10B. Specifically, FIG. 10A shows a graph 1079-1 of raw mooring line data over a period of time 1078, and FIG. 10B shows a graph 1079-2 of the prepared mooring line data from FIG. 10A over the period of time 1078 according to certain example embodiments. Referring to FIGS. 1 through 10B, in the graph 1079-1 of FIG. 10A, the plot 1053 of raw data for tension 1056 in a mooring line (e.g., mooring line 170-1) is measured in kips over time 1078 by a mooring line sensor device 290. The data is constant at 585 kips of tension 1056 for the first approximately ⅔ of the time 1078, and the remaining ⅓ of the time 1078 shows consistently varying measurements of tension 1056. This indicates to the controller 204 that the measurements of the tension 1056 for the last ⅓ of the time 1078 are likely valid, while the rest of the data is not valid. The controller 204 therefore uses one or more algorithms 233 and/or protocols 232 to prepare the data for use in evaluating the securing system (e.g., securing system 175) for a floating structure (e.g., floating structure 105).

As a result, as shown in the graph 1079-2 of FIG. 10B, the controller 204 replaces, using one or more protocols 232 and/or algorithms 233, the first ⅔ of the data during the period of time 1078 with values that are extrapolated/calculated (e.g., based on the measurements of adjacent mooring line sensor devices 290 during the period of time 1078, based on metocean data during the period of time 1078). The result is the plot 1054 of processed data for tension 1056 measured in kips over time 1078, as shown in FIG. 10B. The processed data shown by the plot 1054 in FIG. 10B is used by the controller 204 in this method 498 to evaluate a securing system for a floating structure. In alterative embodiments, the controller 204 can remove the constant measurements without replacing the data points with other values.

Figure 11A:
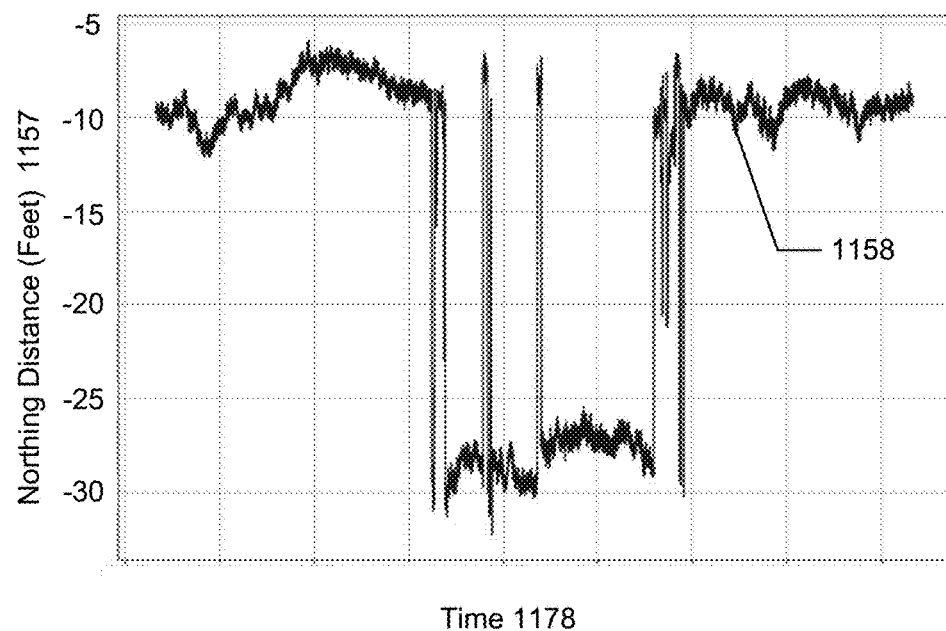
FIG. 11A shows another graph of raw metocean data over a period of time.
Figure 11B:
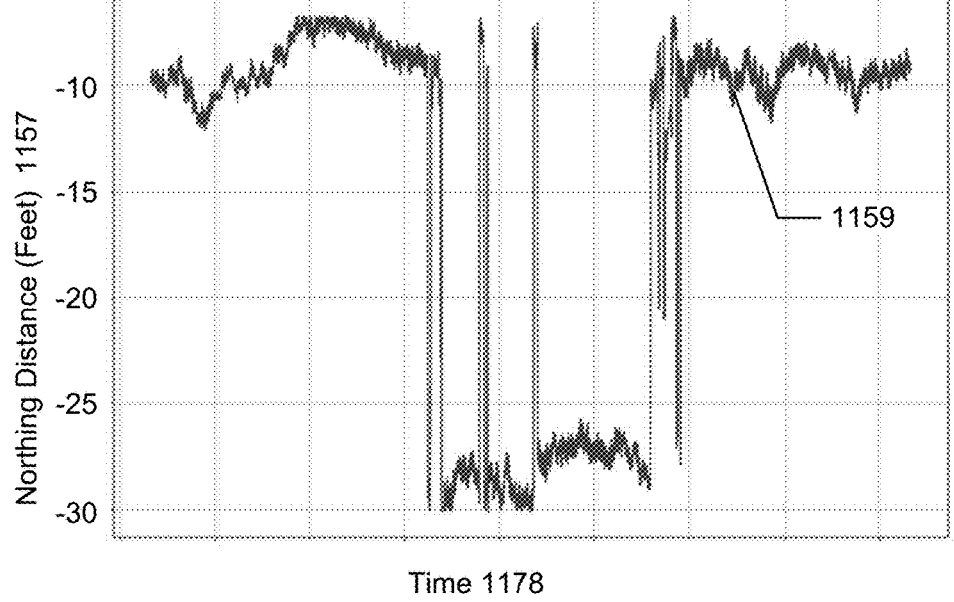
FIG. 11B shows a graph of prepared metocean data from FIG. 11A over the period of time according to certain example embodiments.

Yet another example of outlier data being removed from a data set is shown with respect to FIGS. 11A and 11B. FIG. 11A shows another graph 1179-1 of raw metocean data over a period of time 1178, and FIG. 11B shows a graph 1179-2 of the prepared metocean data from FIG. 11A over the period of time 1178 according to certain example embodiments. Referring to FIGS. 1 through 11B, in the graph 1179-1 of FIG. 11A, the plot 1158 of raw data for northing distance 1157 is measured in feet over time 1178 by a metocean sensor device 239. While most of the data seems to be normal or acceptable, there are some extreme excursions, some temporary and some lasting, where the northing distance exceeds −30 feet. The controller 204 in this case determines, using one or more protocols 232 and/or algorithms 233, that the excursions that exceed −30 feet represent erroneous data points, and so should not be used in evaluating the securing system (e.g., securing system 175) for a floating structure (e.g., floating structure 105), while the rest of the data points are legitimate.

As a result, as shown in the graph 1179-2 of FIG. 11B, the controller 204 eliminates any readings that exceed −30 feet from the plot 1159. The result is the plot 1159 of processed data for northing distance 1157 measured in feet over time 1178, as shown in FIG. 11B. The processed data shown by the plot 1159 in FIG. 11B is used by the controller 204 in this method 498 to evaluate a securing system for a floating structure. In alterative embodiments, the controller 204 can predict/calculate/extrapolate values at the times where the raw data exceeded −30 feet.

Figure 12A:
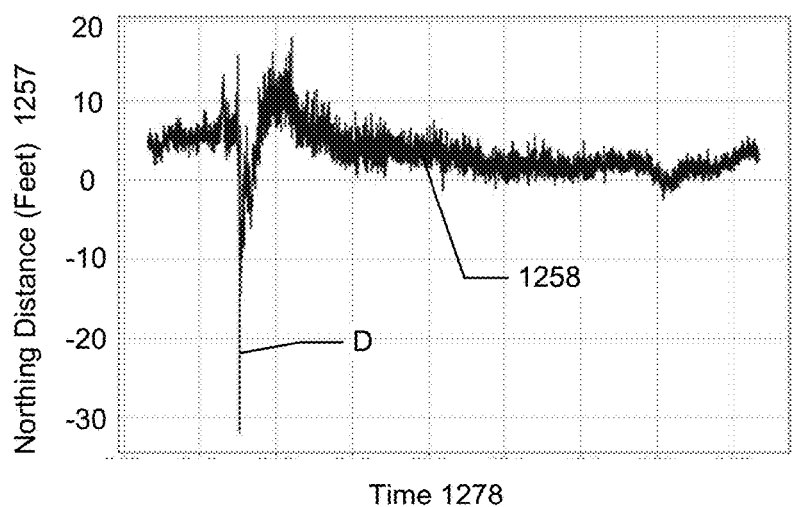
FIGS. 12A through 12C show a series of graphs of raw metocean data over a period of time.
Figure 12B:
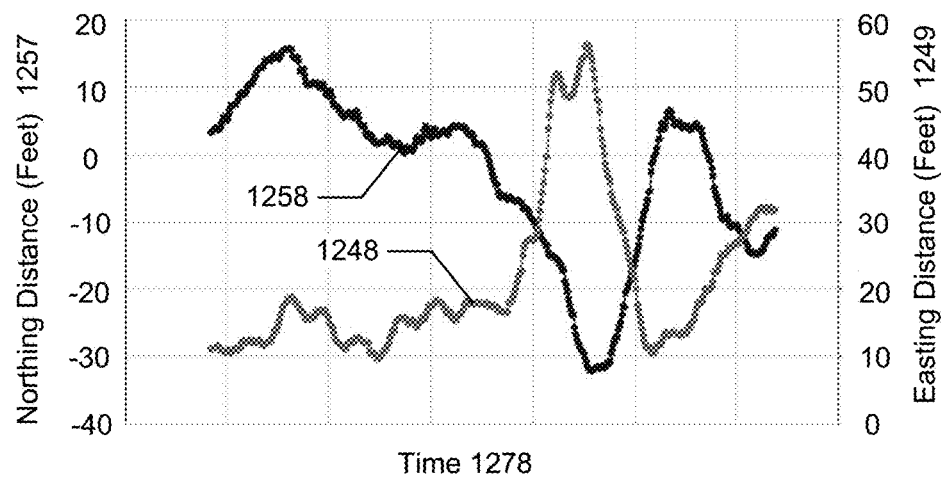
Figure 12C:
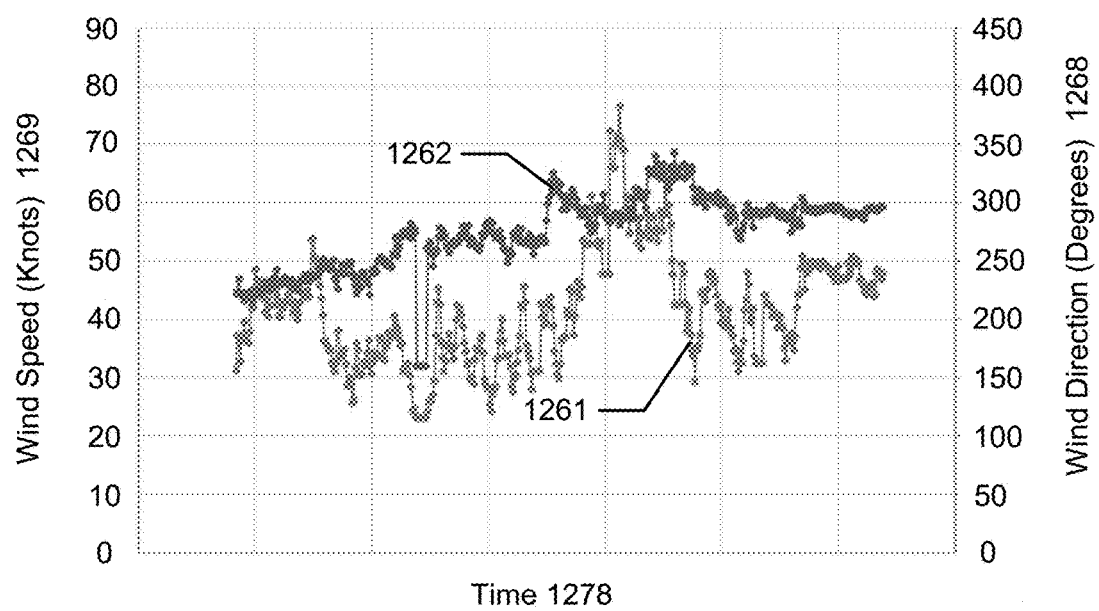
Figure 12D:
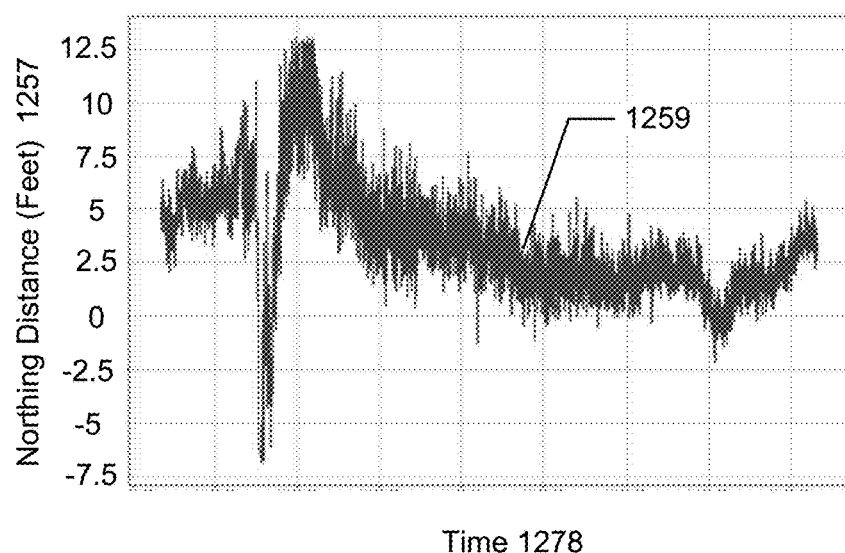
FIG. 12D shows a graph of prepared metocean data from FIG. 12A over the period of time according to certain example embodiments.

Still another example of outlier data being removed from a data set is shown with respect to FIGS. 12A through 12D. FIGS. 12A through 12C show a series of graphs of raw metocean data over a period of time 1278, and FIG. 12D shows a graph 1279-4 of the prepared metocean data from FIG. 12A over the period of time 1278 according to certain example embodiments. Specifically, FIG. 12A shows a graph 1279-1 of raw metocean data in the form of northing distance 1257 over the period of time 1278. FIG. 12B shows a graph 1279-2 of raw metocean data in the form of northing distance 1257 and easting distance 1249 over the portion of time 1278 that covers the dip D in FIG. 12A. FIG. 12C shows a graph 1279-3 of raw metocean data in the form of wind direction 1269 and wind speed 1268 over the portion of time 1278 that covers the dip D in FIG. 12A.

Referring to FIGS. 1 through 12D, in the graph 1279-1 of FIG. 12A, the plot 1258 of raw data for northing distance 1257 is measured in feet over time 1278 by a metocean sensor device 239. While most of the data seems to be normal or acceptable, there is one extreme excursion in the form of a dip D where the northing distance exceeds −30 feet. The controller 204 in this case may initially determine that the data associated with the dip D should be removed from the prepared metocean data. However, using one or more protocols 232 and/or algorithms 233, as well as the data in FIGS. 12B and 12C, the controller 204 decides that the data associated with the dip D is legitimate for use in evaluating the securing system (e.g., securing system 175) for a floating structure (e.g., floating structure 105), while the rest of the data points are legitimate.

For example, one or more protocols 232 may dictate that the controller consider the raw easting distance 1249, the wind speed 1269, and the wind direction 1268 around the time 1278 of the dip D before discarding the raw data of the northing distance 1258 at the time 1278 of the dip D. In the graph 1279-2 of FIG. 12B, the plot 1258 of raw data for northing distance 1257 is measured in feet over time 1278 by a metocean sensor device 239, and the plot 1248 of raw data for easting distance 1249 is measured in feet over the same time 1278 by the same or a different metocean sensor device 239. The plot 1248 of the easting distance 1249 overlaid with the plot 1258 of the northing distance 1257 during the time 1278 of the dip D indicates that a significant wind gust may have occurred.

At this point, one or more protocols 232 may be followed by the controller 204 to analyze the raw data in the graph 1279-3 of FIG. 12C, where the plot 1261 of raw data for wind direction 1268 is measured in degrees over time 1278 by a metocean sensor device 239, and the plot 1262 of raw data for wind speed 1269 is measured in knots over the same time 1278 by the same or a different metocean sensor device 239. The plot 1261 of the wind direction 1268 overlaid with the plot 1262 of the wind speed 1269 during the time 1278 of the dip D validates the theory that a significant wind gust likely occurred around the time of the dip D.

As a result, rather than discard the raw data for the northing distance 1257 around the time 1278 of the dip D, the controller 204 can follow one or more protocols 232 and/or algorithms 233 to calculate/extrapolate data during the dip D (as well as the rest of the time 1278) to generate the plot 1259 of prepared data for the northing distance 1257, measured in feet, over the time 1278. This example illustrates that the method 498 (or steps therein) used by the controller 204 can be adaptive for outlier detection and removal, which offers improved cleaning and preparation of raw data received from sensor devices (e.g., metocean sensor devices 239). In some cases, the protocols 232 and/or algorithms 233 used by the controller 204 to prepare the metocean data can be modified over time.

In addition to preparing metocean data, other types of data (e.g., data received from mooring line sensor devices 290, data received from other securing system sensor devices 291) can also be prepared in this step 483. When a model is in the early stages of development or has not been sufficiently tested (validated), it is possible that the controller 204 is unable to prepare some metocean data sufficiently to generate an accurate output from the model. In other words, until enough experience is gained with the model and/or the data, it is possible that bad data will not be removed and/or that raw data may not be sufficiently processed to allow for an accurate output from the model. This is part of how the tuning process for the models, described in step 489 below, can improve assessing and preparing the metocean data.

In step 484, the prepared metocean data is correlated and analyzed. In certain example embodiments, the prepared metocean data is correlated and analyzed by the controller 204 using one or more protocols 232 and/or algorithms 233. Data correlation and statistical analysis are techniques that the controller 204 can use in preparing the data for machine learning. Implementation of the correlation and statistical analysis by the controller 204 includes selecting the relevant machine learning inputs for evaluating the securing system (e.g., securing system 175) or portions thereof (e.g., tension in the individual mooring lines 170) for a floating structure (e.g., floating structure 105).

Correlation is a technique for investigating the relationship between two quantitative, continuous variables. A correlation coefficient, which is calculated by the controller 204 using one or more protocols 232 and/or algorithms 233, is a measure of the strength of the association between the two variables. In some cases, the controller 204 can generate and maintain one or more correlation coefficient colormaps between pairs of all variables, generated from a subset of all uncleaned raw data. In such a case, a strong correlation can be indicated by a correlation coefficient value of −1.0 to indicate a perfect negative correlation, or by a correlation coefficient of 1.0 to indicate a perfect positive correlation.

In some cases, northing distances and easting distances are strongly associated with (correlated to) tension in mooring lines 170. Further, other metocean data such as heading, pitch, roll, and sea state variables can have a less strong correlation to tension in mooring lines 170. The first order derivatives (rates, such as pitch rate, heading rate, and roll rate) of metocean data and second order derivatives (accelerations, such as surge acceleration, sway acceleration, and heave acceleration) of metocean data are secondarily correlated with tensions of mooring lines 170. Depending on the layout of mooring lines 170 of a securing system 175, tension values of adjacent mooring lines 170 and opposite mooring lines can be well correlated to each other.

In order to communicate correlations between variables to a user 250, the controller 204 can output correlations in one or more of a number of ways. For example, the controller 204 can generate a correlation matrix. As another example, the controller 204 can generate pairwise scatter plots. These various ways to communicate correlations between variables to a user 250 are known to those of ordinary skill in the art. In some cases, the protocols 232 and/or algorithms 233 used by the controller 204 to correlate and analyze the prepared metocean data can be modified over time. In addition to correlating and analyzing the prepared metocean data, other types of data (e.g., data received from mooring line sensor devices 290, data received from other securing system sensor devices 291) can also be correlated and analyzed in this step 484.

In step 485, a determination is made as to whether a model has been developed. The model is used to evaluate a securing system (e.g., securing system 175) for a floating structure (e.g., floating structure 105). The model can include one or more algorithms 233 that are executed based on one or more protocols 232. In certain example embodiments, the model for evaluating a securing system for a floating structure is developed specifically for a particular field operation. When the field operation is in an initial period of time (e.g., the first month, the first four months, the first year), the model may be only partially developed and not yet fully developed. The model can be developed by the controller 204 using one or more protocols 232 and/or algorithms 233. Also, the controller 204 can determine whether the model has been developed. If the model has not been developed, the process proceeds to step 486. If the model has been developed, the process proceeds to step 487.

In step 486, the model is developed. The model can be developed by the controller 204 using one or more protocols 232 and/or algorithms 233. The model can be completely undeveloped in this step 486 at a point in time (e.g., when the field operation is not yet begun). Alternatively, the model can be partially developed at a particular point in time when this step 486 occurs. The number of times that this step 486 occurs before the model is fully developed can vary based on one or more of a number of factors, including but not limited to the configuration of the securing system, the type of field operation, the configuration of the floating structure, the number of sensor devices (e.g., metocean sensor devices 239), and the types of parameters measured by the sensor devices.

Figure 13:
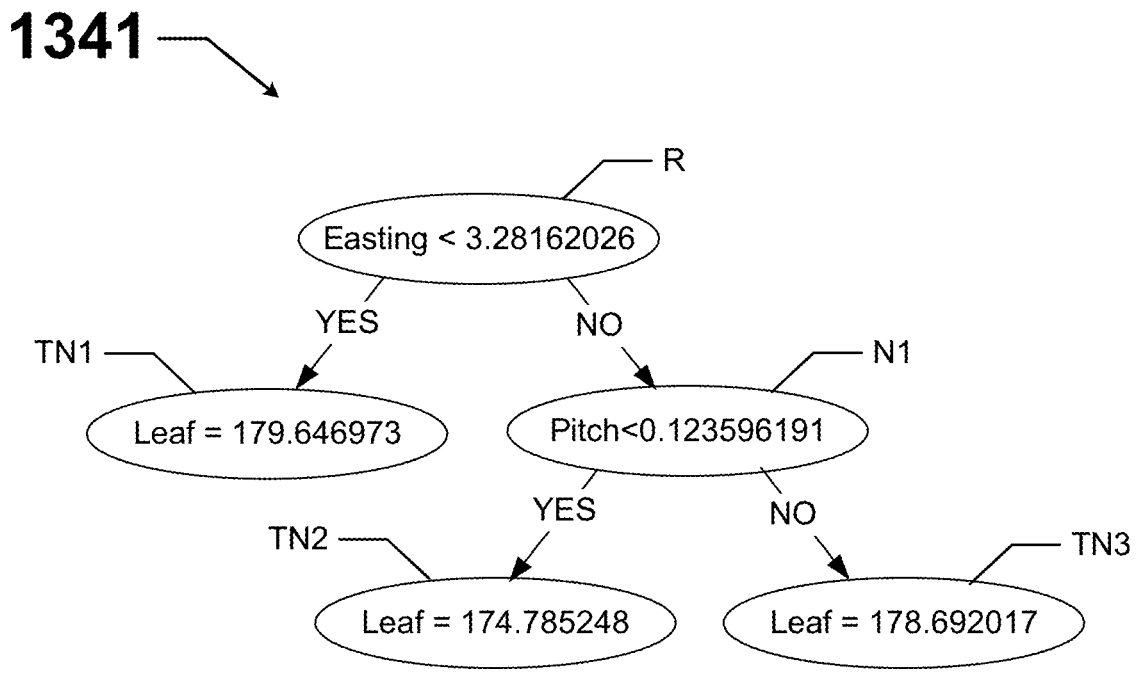
FIG. 13 shows an example of a decision tree used in a model according to certain example embodiments.

There are also a number of different mathematical approaches that the controller 204 can take in developing the model. For example, the model can include some type of regression analysis with respect to the metocean data. As another example, the model can include an ensemble of decision trees. FIG. 13 shows an example of a decision tree 1341 used in a model according to certain example embodiments. Referring to FIGS. 1 through 13, the decision tree 1341 (also called a logic tree 1341 herein) includes a root R, which leads to two options. The Yes option from the root R is a terminal node TN1 (also sometimes called a leaf), and the No option from the root R is node N1. Node N1 leads to two options. The Yes option from the node N1 is a terminal node TN2, and the No option from the node N1 is terminal node TN3. Each decision tree can have any depth, which represents the number of maximum number of layers between the root R and a terminal node TN. In this case, the decision tree 1341 has a depth of three between R and TN2 and between R and TN3.

The easting input in this decision tree 1341 is the root R (sometimes so called an interior node), where the data is split based on its value. Each split at an interior node (e.g., root R, node N1) can be chosen to minimize entropy (a measure of impurity of a node). The value of each of the leafs TN1, TN2, and TN3 is used to make a prediction of that decision tree 1341 for a tension in a mooring line (e.g., mooring line 170-2). The final prediction for that line tension will be the sum of the prediction values of all of the terminal nodes TNs in all of the decision trees. When decision trees, such as the decision tree 1341, are used to generate a model, one large decision tree can be used. In addition, or in the alternative, a number of small decision trees can be used. In some cases, the outputs of multiple small decision trees can be used to develop a large decision tree under the theory that more accurate regression predictions or classifications will result.

A model can have any of a number of inputs (e.g., types of metocean data). For example, a model can have 6 inputs (e.g., easting, northing, roll, pitch, heading, and heave). As another example, a model can have 12 inputs (e.g., easting, northing, roll, pitch, heading, heave, pitch rate, heading rate, roll rate, surge acceleration, sway acceleration, and heave acceleration). The controller 204 can set the number and/or types of inputs used in a model.

Algorithms 233 used in developing the model can employ fast computational speed and good prediction performance. One or more algorithms 233 can be developed (e.g., generated, adjusted) by the controller 204 using computer learning. In addition, or in the alternative, one or more algorithms 233 can be provided to the controller 204 by a user 250 (e.g., through a user system 255) and/or the network manager 280. In some cases, more than one model can be developed simultaneously to determine which provides the most accurate results to evaluate a securing system for a floating structure. A model developed in this step 486 can be defined by a number of parameters (e.g., maximum number of nodes, minimum amount of metocean data used, minimum or maximum depth of a logic tree, the number of logic trees).

In step 487, each model is validated. Each model can be validated by the controller 204 using one or more protocols 232 and/or algorithms 233. Validating (also referred to as testing herein) a model includes determining the accuracy of the output of a model. Validating a model can include validating portions thereof, including but not limited to inputs, parameters, protocols 232, algorithms 233, and decision trees (e.g., decision tree 1341). A model can be validated in any of a number of ways (e.g., comparing the model output to the output of an independent model, to an expected value, or to measurements of an independent sensor device (e.g., a mooring line sensor device 290) not used in the model). In certain example embodiments, a model is validated using some or all of the metocean data. For example, raw metocean data (e.g., for the past 30 days) can be set aside and used to evaluate and validate a model. Also, in validating a model, any of a number of metrics (e.g., mean absolute error (MAE)) can be used. MAE is one of the performance indicators used to evaluate the skill of a machine learning model. In some cases, due to the machine learning nature of a model, some level of 'noise' in the data is tolerated without compromising the prediction performance (and so the validity) of the model.

Figure 14:
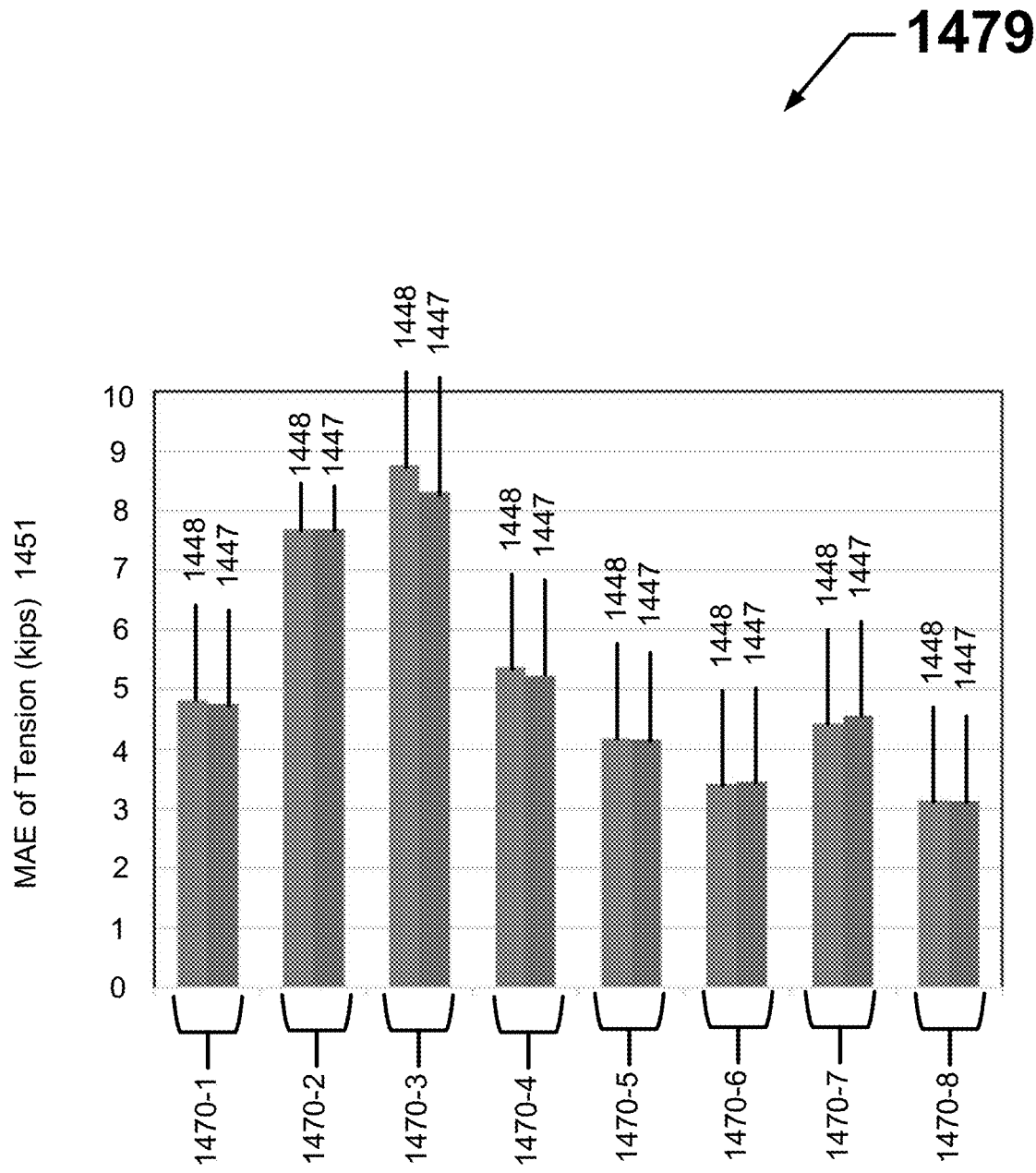
FIG. 14 shows a graph of the results of testing two models according to certain example embodiments.

In some cases, tabulated statistics of all the variables considered in the development of a model were generated by analyzing all the cleaned raw data, including for example the minimum, maximum, mean, and standardization. Those statistics can be used in a blind test as a pre-check of input data prior to evaluating a securing system for a floating structure. FIG. 14 shows a graph 1497 of the results of testing two models according to certain example embodiments. Specifically, FIG. 14 compares the MAE of predicted individual mooring line tensions 1451 for a 12-input model 1448 and a 6-input model 1447. In this example, the inputs for the model 1447 are easting, northing, roll, pitch, heading, and heave. Also, the inputs for the model 1448 are easting, northing, roll, pitch, heading, heave, pitch rate, heading rate, roll rate, surge acceleration, sway acceleration, and heave acceleration.

Referring to FIGS. 1 through 14, the graph 1479 of FIG. 14 plots the MEA of predicted individual mooring line tension values 1451 for each of 8 mooring lines 1470 using model 1448 and model 1447. Each mooring line 1470 is part of a securing system and can be substantially the same as the mooring lines 170 discussed above with respect to FIG. 1. Overall, the graph 1479 shows that the MAE of each predicted mooring line tension values 1451, regardless of whether model 1447 or model 1448 is used, is below 9 kips, which is less than 1.5% of the mean line tension levels of the mooring lines 1470. As Table 1 shows below, model 1447 outperforms model 1448 except for with mooring line 1470-6 and mooring line 1470-7.

TABLE 1

| Mooring Line | Mean Line Tension Value (in kips) | MAE of tension value 1451 (in kips) using model 1447 | MAE of tension value 1451 (in kips) using model 1448 |
|---|---|---|---|
| 1470-1 | 610 | 4.772 | 4.827 |
| 1470-2 | 720 | 7.696 | 7.697 |
| 1470-3 | 690 | 8.326 | 8.757 |
| 1470-4 | 640 | 5.226 | 5.37 |
| 1470-5 | 530 | 4.161 | 4.173 |
| 1470-6 | 480 | 3.453 | 3.419 |
| 1470-7 | 460 | 4.559 | 4.428 |
| 1470-8 | 500 | 3.117 | 3.146 |

The protocols 232 and/or algorithms 233 used by the controller 204 to validate or test a model can change over time based on, for example, additional data (e.g., metocean data), input from a user 250, and supplemental information (e.g., measurements from mooring line sensor devices 290). Earlier in the life of a field operation, validating a model may be a less precise function compared to validating the same model much further into the life of the field operation. As more data for a field operation is collected, assessed, prepared, and analyzed, the models, as well as the validation of those models, can become more accurate and precise through the reduction of bias in the data and a more holistic approach to interpreting the data.

Figure 15:
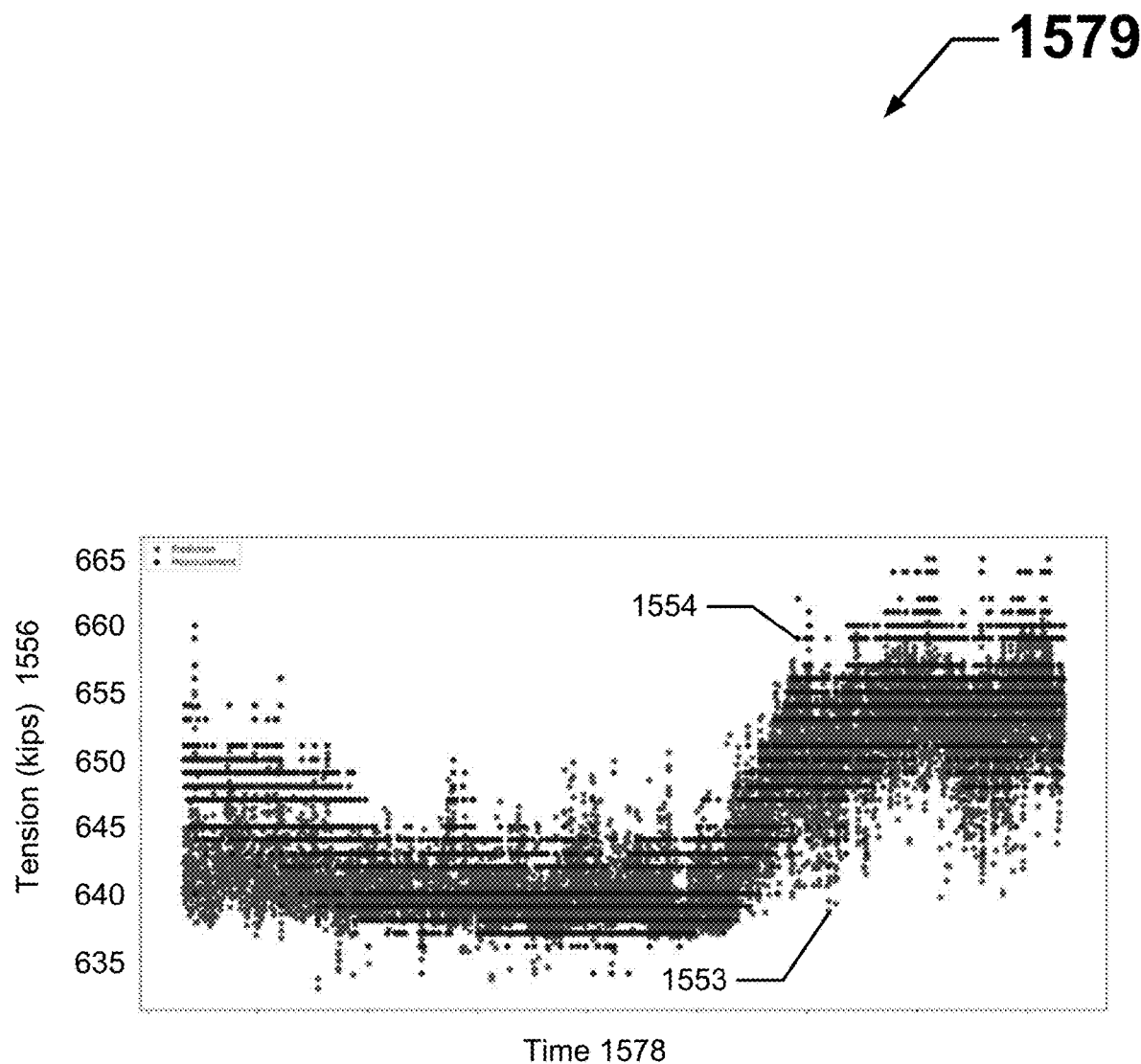
FIG. 15 shows a graph of raw mooring line data over a period of time according to certain example embodiments.

When validating a model, some bias and disparity of individual data points can be discernible though general trends and spreads in the prediction following the measurement. A close look at a measurement can raise some questions in the data quality of the measurement (e.g., as manifested by an upward or downward staircase-like pattern in the time series), as shown in FIG. 15. FIG. 15 shows a graph 1579 of raw mooring line data over a period of time 1578 according to certain example embodiments. Referring to FIGS. 1 through 15, the graph 1579 of FIG. 15 shows a plot 1553 of predicted data for tension 1556 in a mooring line (e.g., mooring line 170-1), measured in kips over time 1578, and plot 1554 represents the measured data for tension 1556, as measured by a mooring line sensor device 290 over the same period of time 1578.

In this case, the plot 1554 showing the measured tension data, as confirmed by the plot 1553 showing the predicted tension data for the same period of time 1578, indicates that the mooring line sensor device 290 is beginning to fail. Specifically, the step-like plot 1554 is inconsistent with what actual measured tension data from a mooring line sensor device 290 should display. As a result, the controller 204, using one or more protocols 232 and/or algorithms 233, can determine that the mooring line sensor device 290 is beginning to fail and should not be relied upon for future measurements. While this example of FIG. 15 is used to indirectly validate a model, it also shows that a developed model can be relied upon to identify when one or more sensor devices fail or are beginning to fail.

Testing a model can be conducted in any of a number of manners using any type of data. For example, a model can undergo a blind test (new data), where the model is given an unseen time series of inputs (e.g., easting, northing, roll, pitch, heading, heave, pitch rate, heading rate, roll rate, surge acceleration, sway acceleration, heave acceleration) and predicts the tension of an individual mooring line (e.g., mooring line 170-6) for each time step. The new data can be raw data (as in step 481), assessed data (as in step 482), or prepared (as in step 483).

Figure 16:
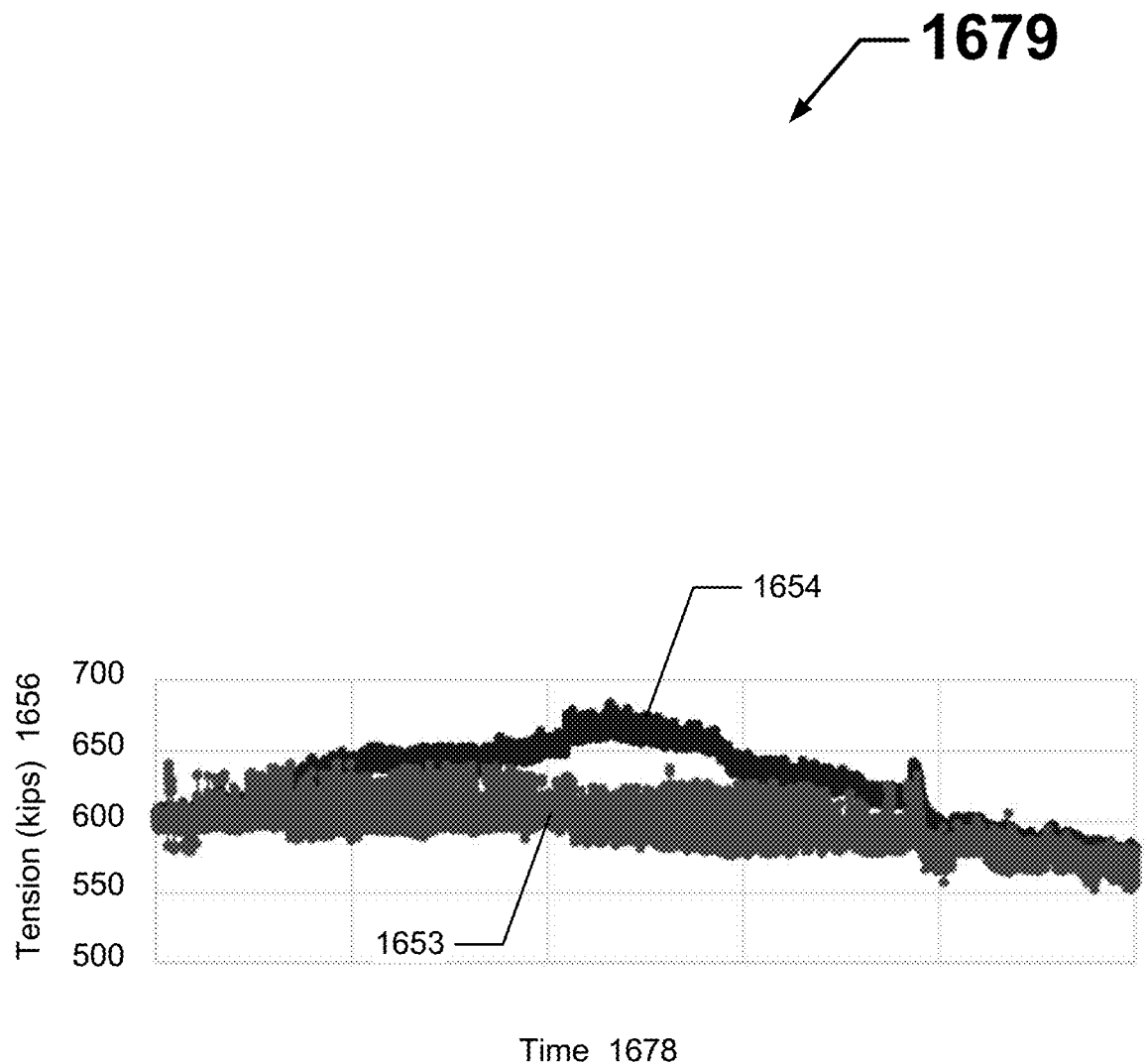
FIG. 16 shows a graph showing predicted and measured tension according to certain example embodiments.

Validating a model can lead to the discovery of various model characteristics. For example, poor prediction with large bias can be noticed in limited cases (two days out of 30 days). FIG. 16 shows a graph 1679 showing predicted and measured tension 1656 according to certain example embodiments. Referring to FIGS. 1 through 16, the graph 1679 of FIG. 16 shows plot 1654 for measured values and plot 1653 for predicted values of tension 1656 (in kips) over time 1678. Aside from the middle of the period of time 1678 in the graph 1679, plot 1653 and plot 1654 track each other well. However, in the middle of the period of time 1678 in the graph 1679, plot 1654 shows a markedly higher tension 1656 relative to plot 1653. By comparing associated model inputs (e.g., easting, northing, roll, pitch, heading, heave) over time, there may be a prior scattering in the easting, roll, pitch, heading, and heave data. Knowing the strong correlation of easting with the tension (see FIGS. 18 and 19 below), it can be a reasonable conclusion that the significant "noise" in the position data tends to lead to the large bias in predicted values (model output), which can lead to the large difference between plot 1654 and plot 1653 in the middle of the period of time 1678 in the graph 1679 of FIG. 16.

As another example, the output of a model can be sensitive to inputs that measure rates and acceleration (e.g., surge acceleration, sway acceleration, heave acceleration, heading rate, roll rate and pitch rate). For instance, when heave acceleration has intermittent (and inaccurate) zero readings, the model using this data can output significant spikes in tension of a mooring line during the corresponding times. This finding can imply that some salient outliers over a certain period in the model might be indicators of malfunctioning/failing sensor devices.

Example models discussed herein are developed based on machine learning from existing datasets. As a result, the predictive capability of example models can be limited to the data range used in the training of those models. For example, the data range for northing and easting values is limited by the maximum and minimum values that the associated metocean sensor devices 239 can physically measure. During a field operation, such as when the floating structure is an offshore platform in a gulf or ocean during a strong storm (e.g., a hurricane or cyclone), actual values for some parameters (e.g., northing, easting) may exceed what the metocean sensor devices 239 can measure. Though the example models still can run without these actual high values, the lack of these actual values can affect the output of an example model, particularly over an extended period of time, thereby affecting the evaluation of a securing system.

To mitigate this limitation, input data checking and flagging can be incorporated prior to use of an example model. For example, northing and easting measurements, generated by metocean sensor modules 239, can be checked against the known data range (e.g., from a training dataset). A flag can be raised when the northing and easting data are beyond the known ranges. Similar checks can be made for the motion data (e.g., pitch, roll, heading, heave). When the inputs are out of their respective known ranges, the output (e.g., predicted line tension) of a model should be treated with caution.

In step 488, a determination is made as to whether a model needs tuning. The determination as to whether a model needs tuning can be made by the controller 204 using one or more protocols 232 and/or algorithms 233. In certain example embodiments, a model needs tuning (also called self-learning herein) when its output is not within an expected range of values. In addition, or in the alternative, a model can require tuning upon discovery of a faulty sensor device (e.g., a metocean sensor device 239). In addition, or in the alternative, a model needs tuning based on instructions from a user 250 or the network manager 280. If a model needs tuning, then the process proceeds to step 489. If a model does not need tuning, then the process proceeds to step 491.

In step 489, each model can be tuned (also sometimes referred to as adjusting or training the model). Each model can be tuned by the controller 204 using one or more protocols 232 and/or algorithms 233. Tuning a model can include tuning portions thereof, including but not limited to inputs, parameters, protocols 232, algorithms 233, and decision trees (e.g., decision tree 1341). A model can be tuned in any of a number of different ways. For example, a model can be tuned using a blind test, selected from some period of time (e.g., 12 months throughout a calendar year). The remaining raw dataset can be split (e.g., 80% and 20%) between training and 20% testing during the model training. The difference between the blind test dataset and 20% testing dataset is that the former was never seen by the model during training/tuning.

When logic or decisions trees (such as what is shown in FIG. 13 above) are used, the decision trees can be trained in succession so that each new (or modified) model can correct errors found in the previous version. Also, the parameters defining one or more decision trees can be adjusted. For instance, various parameters of a model can be selected and iteratively tuned by performing a grid search using an n-fold cross-validation method on the training dataset, measured by MAE.

As an example of a parameter that can be adjusted, the number of rounds or iterations can be changed. In such a case, the number of rounds or iterations can be determined initially using an early stopping approach incorporated in the protocols 232 and/or algorithms 233 by monitoring the training procedure of the model once the model performance on a test dataset has not improved after a fixed number of training iterations. However, as shown in FIG. 17, which shows a graph 1779 of MAE 1746 for model tuning according to certain example embodiments, when the number of data samples 1745 gets large, steady but slow reduction in MAE 1746 occurs.

Figure 17:
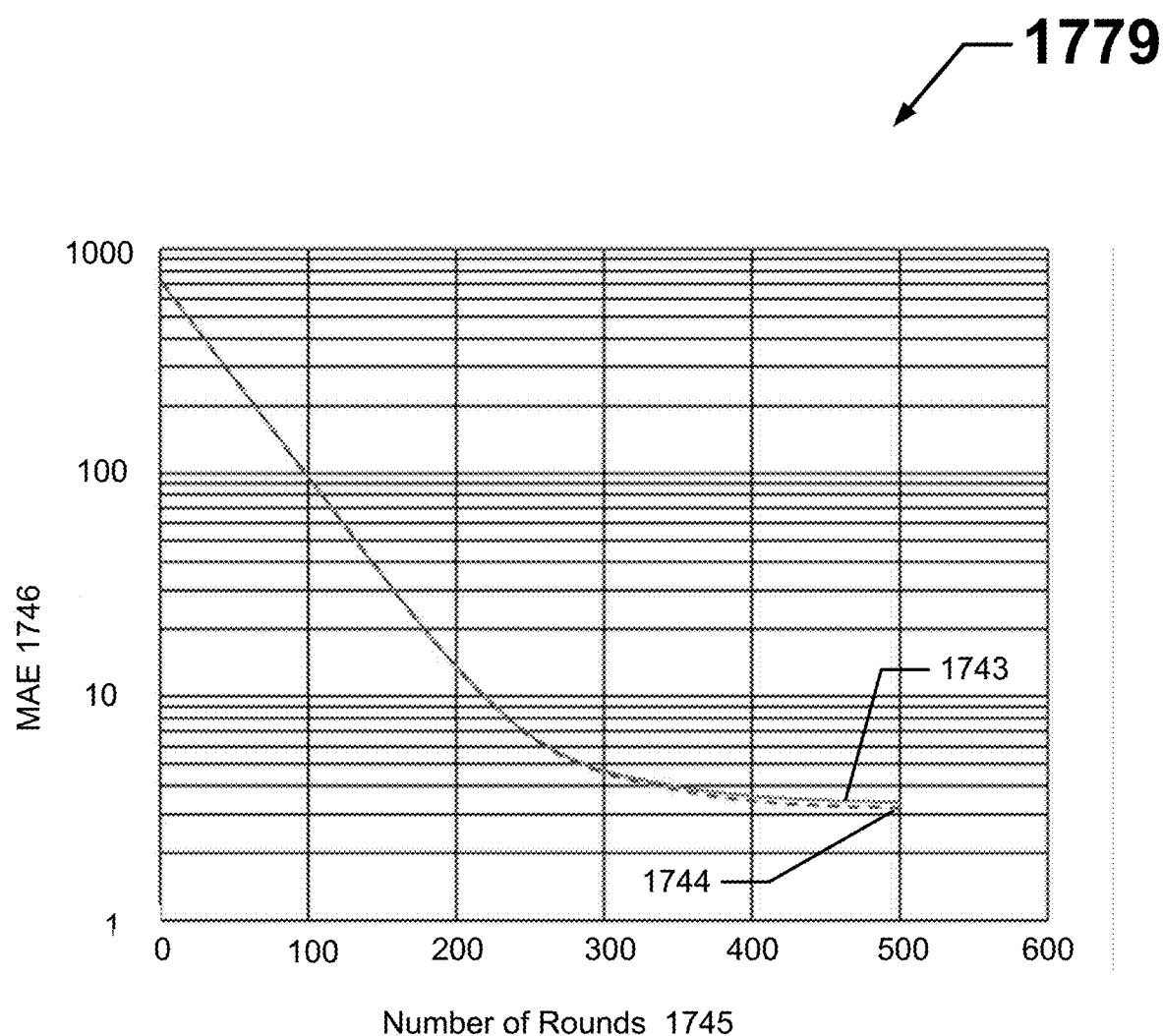
FIG. 17 shows a graph of mean absolute error in model tuning according to certain example embodiments.

Referring to FIGS. 1 through 17, the graph 1779 of FIG. 17 shows a plot 1743 of MAE 1746 during testing of a model and a plot 1744 of MAE 1746 during training of the model. The MAE 1746 along the vertical axis is on a logarithmic scale, while the number of rounds 1745 along the horizontal axis is on a linear scale. In both cases, as the number of rounds (iterations) 1745 increases, the MAE 1746 decreases. At first, during the first approximately 250 rounds 1745, the decrease in MAE 1746 is linear, with plot 1743 and plot 1744 essentially overlapping each other. Above 250 rounds 1745, the rate of decrease in MAE 1746 slows appreciably, with the rate of decrease in MAE 1746 for plot 1744 being slightly greater (e.g., less than 10%) than the rate of decrease in MAE 1746 for plot 1743.

The final number of rounds 1745 can be determined by monitoring the MAE 1746 of both the training (corresponding to plot 1744) and testing (corresponding to plot 1743) datasets after tuning all other parameters. Model overfitting was mainly monitoring by the MAE 1746 of the training dataset (corresponding to plot 1744) in comparison with the MAE 1746 of the testing dataset (corresponding to plot 1743) by cross validation. The intention in this case was to have a similar MAE 1746 for both datasets (plots 1743 and plot 1744) when tuning the model parameters, a number of which are discussed below. In this case, the MAE 1746 of the testing dataset (corresponding to plot 1743) was controlled to be less than 10% higher than the MAE 1746 of the training dataset (corresponding to plot 1744). It may be determined that the optimal number of rounds 1745 in this scenario is 400.

As another example, the number of logic trees can be changed. As still another example, the learning rate (sometimes called eta or the rate of shrinkage) after each iteration can be changed. For instance, as applied to FIG. 17, the learning rate can be controlled at 0.1 or less to avoid overfitting, which was in this study monitored by the MAE 1746 of the training (corresponding to plot 1744) and test (corresponding to plot 1743) datasets with 5-fold cross-validation. In comparison with the learning rate 0.1, setting the learning rate to 0.005 marginally improved the model performance measured by MAE 1746 but significantly increase the number of rounds 1745 to achieve the comparable MAE 1746.

As yet another example, the minimum weight or number of samples required in order to add a node to a decision tree can be changed. As still another example, the maximum number of nodes from the root to a leaf in a decision tree (also referred to as the maximum depth of a decision tree) can be changed. For instance, as applied to FIG. 17, the non-linear relationship between the tensions of individual mooring lines and platform position and motions may necessitate a deep decision tree, while overfitting due to such factors as noise may need to be monitored and curbed.

As still another example, the subsampling ratio of the data samples used to train a model or a logic tree can be changed. As yet another example, the subsampling ratio of columns of the data samples used to build a new logic tree can be changed. As still another example, the minimum loss reduction required to make a split on a leaf node of a logic tree can be changed. For instance, as applied to FIG. 17, a grid search with an n-fold cross-validation method can be used for tuning the minimum loss reduction after determining the maximum depth of a decision tree and the minimum weight required to create a new node in the decision tree. The higher the minimum loss reduction, the lower the difference in MAE 1746 between training (corresponding to plot 1744) and testing (corresponding to plot 1743) datasets can be achieved.

Figure 18:
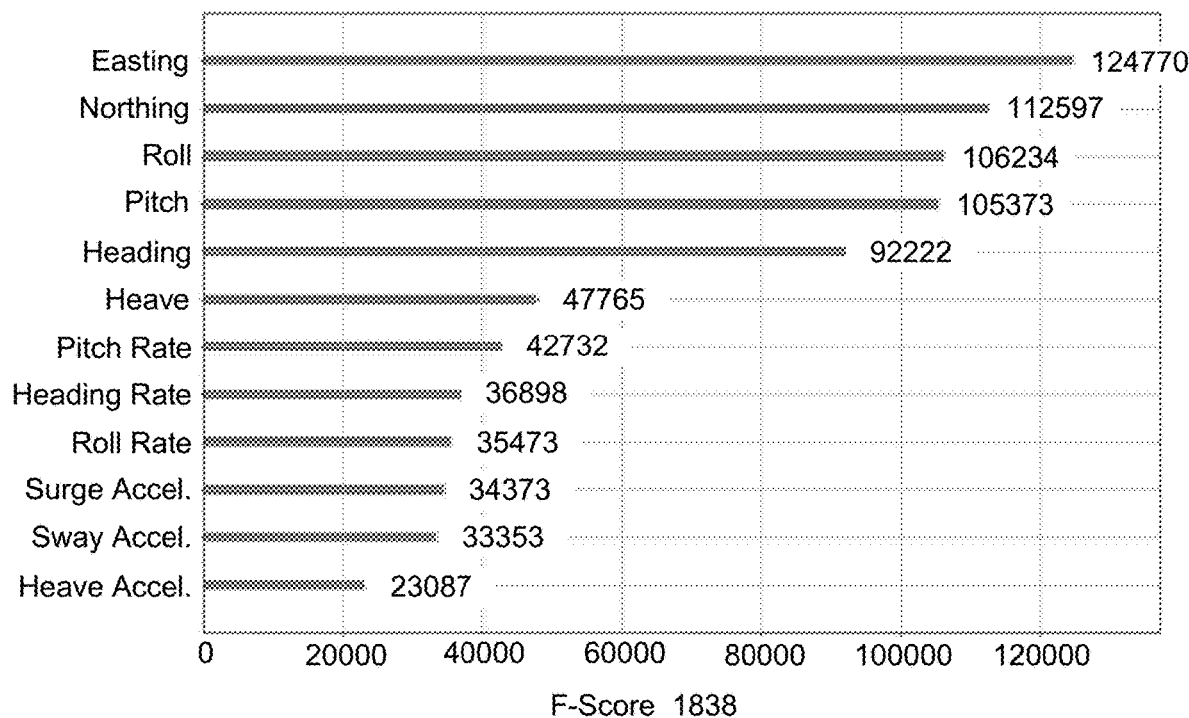
FIG. 18 shows a graph of the feature importance plot for the 12 inputs of a model according to certain example embodiments.
Figure 19:
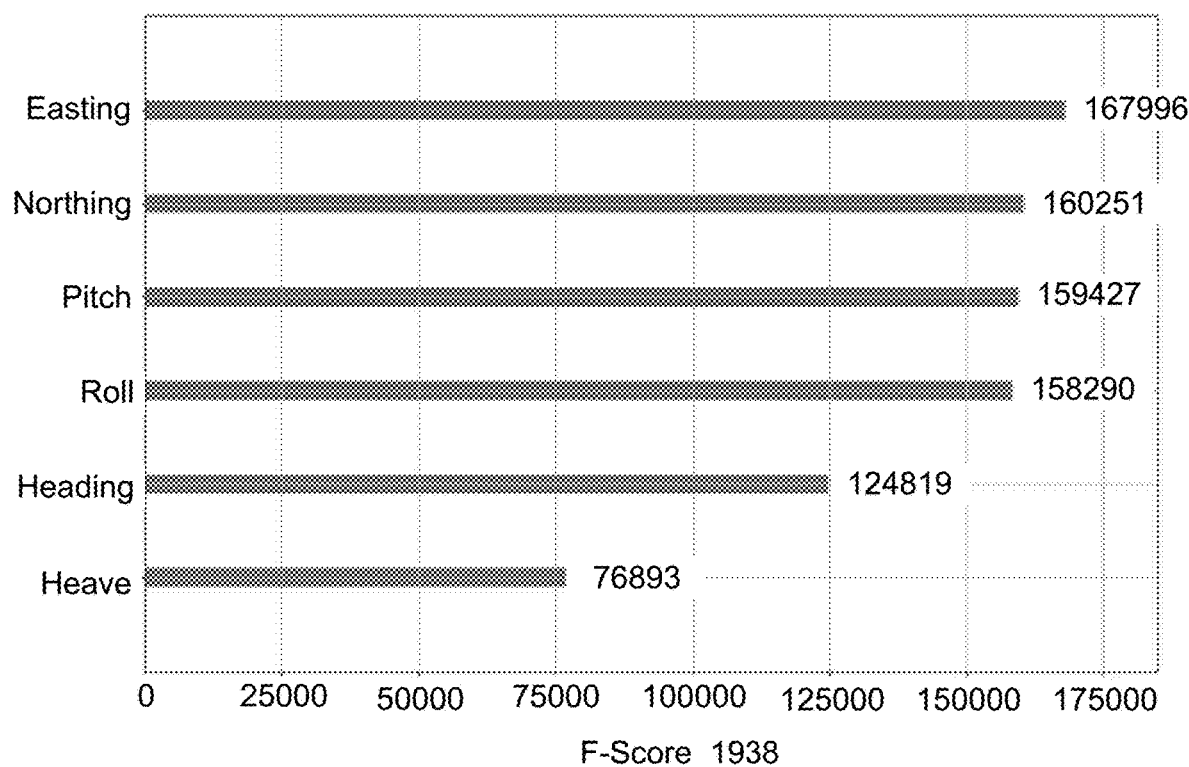
FIG. 19 shows a graph of the feature importance plot for the 6 inputs of another model according to certain example embodiments.

One benefit of using ensembles of decision trees when creating a model is that a trained model retains the estimates of feature (also called a parameter or an input) importance. A score for each parameter indicates how valuable that parameter is in the construction of all the boosted decision trees within the model. The more a parameter is used to make key decisions or have large impacts with decision trees, the higher its relative importance. FIG. 18 shows a graph 1879 of the feature importance plot for the 12 inputs of a model according to certain example embodiments. FIG. 19 shows a graph 1979 of the feature importance plot for the 6 inputs of another model according to certain example embodiments.

Referring to FIGS. 1 through 19, the graph 1879 of FIG. 18 shows the F-Score 1838 along the horizontal axis. Listing the 12 inputs in order from the top (highest F-Score 1838) to the bottom (lowest F-Score 1838), easting has a F-Score 1838 of 124770, northing has a F-Score 1838 of 112597, roll has a F-Score 1838 of 106234, pitch has a F-Score 1838 of 105373, heading has a F-Score 1838 of 92222, heave has a F-Score 1838 of 47765, pitch rate has a F-Score 1838 of 42732, heading rate has a F-Score 1838 of 36898, roll rate has a F-Score 1838 of 35473, surge acceleration has a F-Score 1838 of 34373, sway acceleration has a F-Score 1838 of 33353, and heave acceleration has a F-Score 1838 of 23087. In other words, parameters indicating the position (in this case, northing and easting) of the floating structure (e.g., floating structure 105) and motions (in this case, roll, pitch, heave, and heading), or essentially 6-DoF motions, seemed to be more important for the model.

The graph 1979 of FIG. 19 shows the F-Score 1938 along the horizontal axis. Listing the 6 inputs in order from the top (highest F-Score 1938) to the bottom (lowest F-Score 1938), easting has a F-Score 1938 of 167996, northing has a F-Score 1938 of 160251, pitch has a F-Score 1938 of 159427, roll has a F-Score 1938 of 158290, heading has a F-Score 1938 of 124819, and heave has a F-Score 1938 of 76893. In this case, the results shown in the graph 1979 are substantially consistent with the conclusions of the correlation analysis during data preparation in step 483 above.

In step 492, the securing system is evaluated using the model and the recent metocean data. The securing system can be evaluated by the controller 204 using one or more protocols 232 and/or algorithms 233. For example, the controller 204 can compare the output of one or more models with one or more threshold values (part of the stored data 234). This comparison can include a varying scale (e.g., no problems, failure of the securing system, problem developing with the securing system) in the evaluation of the securing system. The evaluation can be specific as to a component (e.g., mooring line 170-4) of a securing system and/or a potential problem (e.g., the level of tension in the mooring line 170-2 suggests that the mooring line 170-2 is starting to fail and can last approximately one more month before the problem escalates to a total failure).

Figure 20:
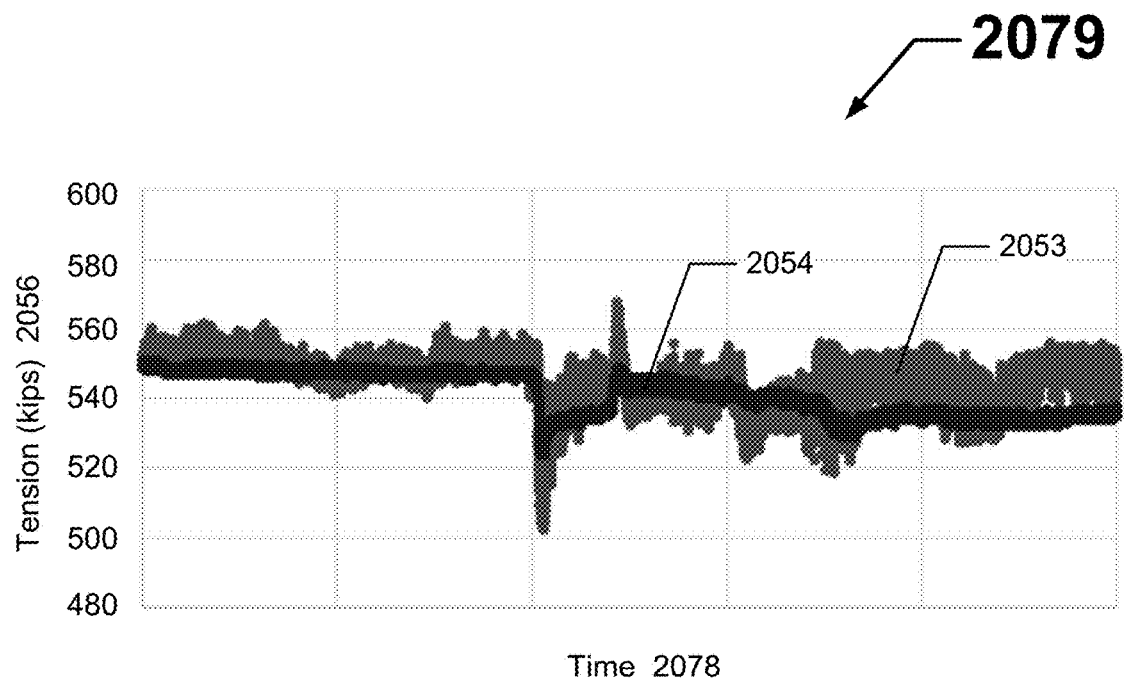
FIGS. 20 and 21 each shows a graph showing predicted and measured tension according to certain example embodiments.
Figure 21:
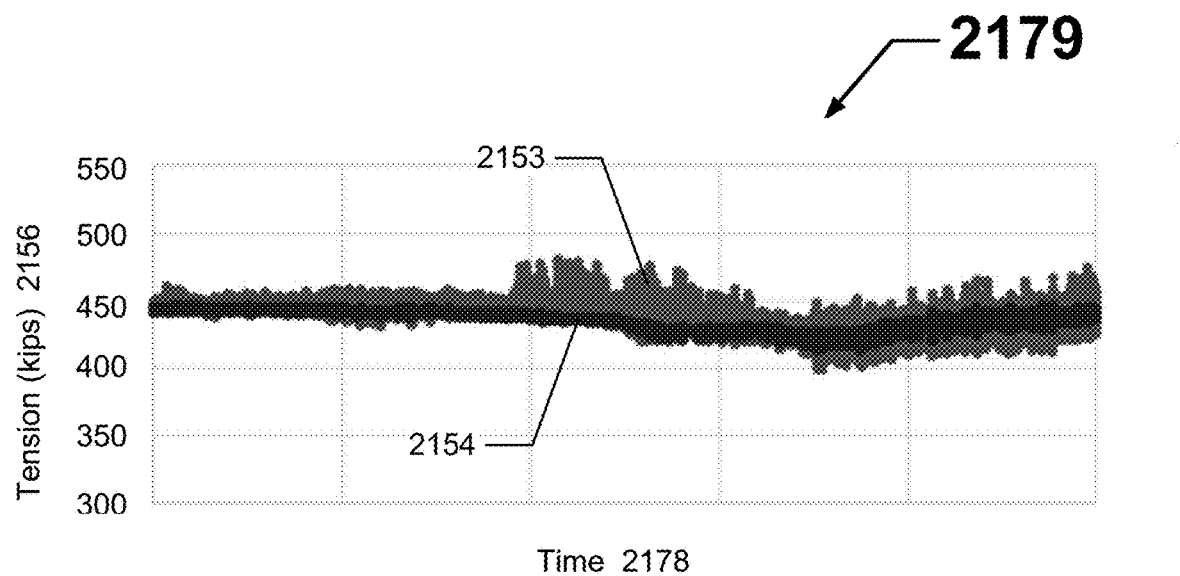

There can be varying ways in which a model can be used to evaluate a securing system (or potion thereof). For example, a model can be used to evaluate the securing system in real time, as shown in FIGS. 20 and 21, which each shows a graph showing predicted and measured tension according to certain example embodiments. Specifically, FIG. 20 shows a graph 2079 showing predicted and measured tension 2056 according to certain example embodiments. FIG. 21 shows another graph 2179 showing predicted and measured tension 2156 according to certain example embodiments.

Referring to FIGS. 1 through 21, the graph 2079 of FIG. 20 shows plot 2054 for measured values and plot 2053 for predicted values of tension 2056 (in kips) over time 2078. Aside from the middle of the period of time 2078 in the graph 2079, the plot 2053 and the plot 2054 track each other well, showing that the model (in this case, a model using northing, easting, roll, pitch, heave, and heading as inputs) is well tuned and can predict tension 2046 accurately and in real time. Similarly, the graph 2179 of FIG. 21 shows plot 2154 for measured values and plot 2153 for predicted values of tension 2156 (in kips) over time 2178. Aside from the middle of the period of time 2178 in the graph 2179, the plot 2153 and the plot 2154 track each other well, showing that the model (in this case, a model using northing, easting, roll, pitch, heave, heading, pitch rate, heading rate, roll rate, surge acceleration, sway acceleration, and heave acceleration as inputs) is well tuned and can predict tension 2146 accurately and in real time. In both cases, time series raw data was used as inputs to the models.

By using models such as those used in FIGS. 20 and 21, in lieu of the running computationally intensive time-domain mooring analysis, tension values of individual mooring lines can be calculated in essentially real-time with recorded floating platform positions and motions (essentially 6-DoF motions). The position and motion inputs to the model could be in the form of a time series or just a single data sample at one time instant. A user 250 can have the flexibility of selecting a 6-input model (as used in FIG. 20) or a 12-input model (as used in FIG. 21).

In cases where a securing system (e.g., securing system 175) includes mooring lines (e.g., mooring lines 170), one or more of the mooring line sensor devices 290 can stop recording due to possible equipment malfunction, data transfer failure, sensor failure, and/or some other malfunction. In these cases, an example model can help bridge the data gap to ensure continuous monitoring of the securing system (or portion thereof), and so allow for compliance with applicable industry standards and/or regulations. Having one or more example models that continuously output mooring line tension data could also help with fatigue calculations for the mooring lines using actual in-service line tension data.

Figure 22:
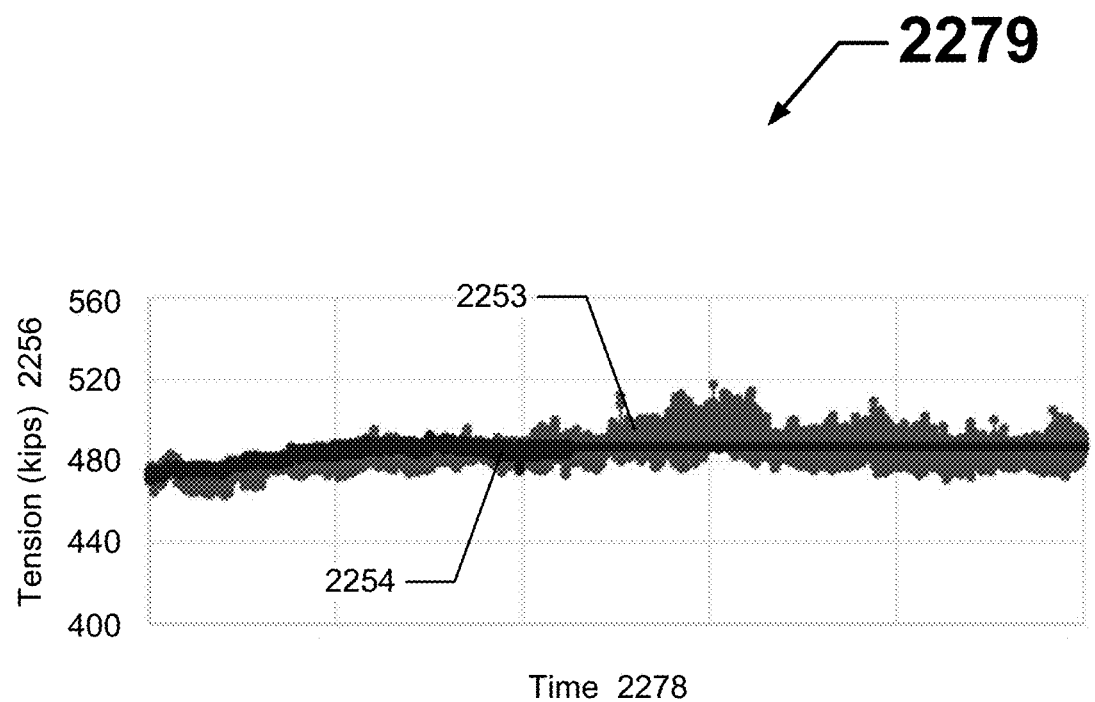
FIG. 22 shows a graph showing how the output of a model can take the place of a failed sensor device for a securing system according to certain example embodiments.

FIG. 22 shows a graph 2279 showing how the output of a model can take the place of a failed sensor device for a securing system according to certain example embodiments. Referring to FIGS. 1 through 22, the graph 2279 of FIG. 22 shows plot 2254 for measured values and plot 2253 for predicted values of tension 2256 (in kips) over time 2278. The measured values for plot 2254 are received from a mooring line sensor device 290. As the graph 2279 shows, at almost halfway into the period of time 2278 shown, the mooring line sensor device 290 fails, outputting a constant tension 2256 in plot 2254. By using the output of the example model, as shown by plot 2253, the output from the model can be used to tension 2256 of the mooring line in real time to accurately evaluate the securing system in real time.

Figure 23:
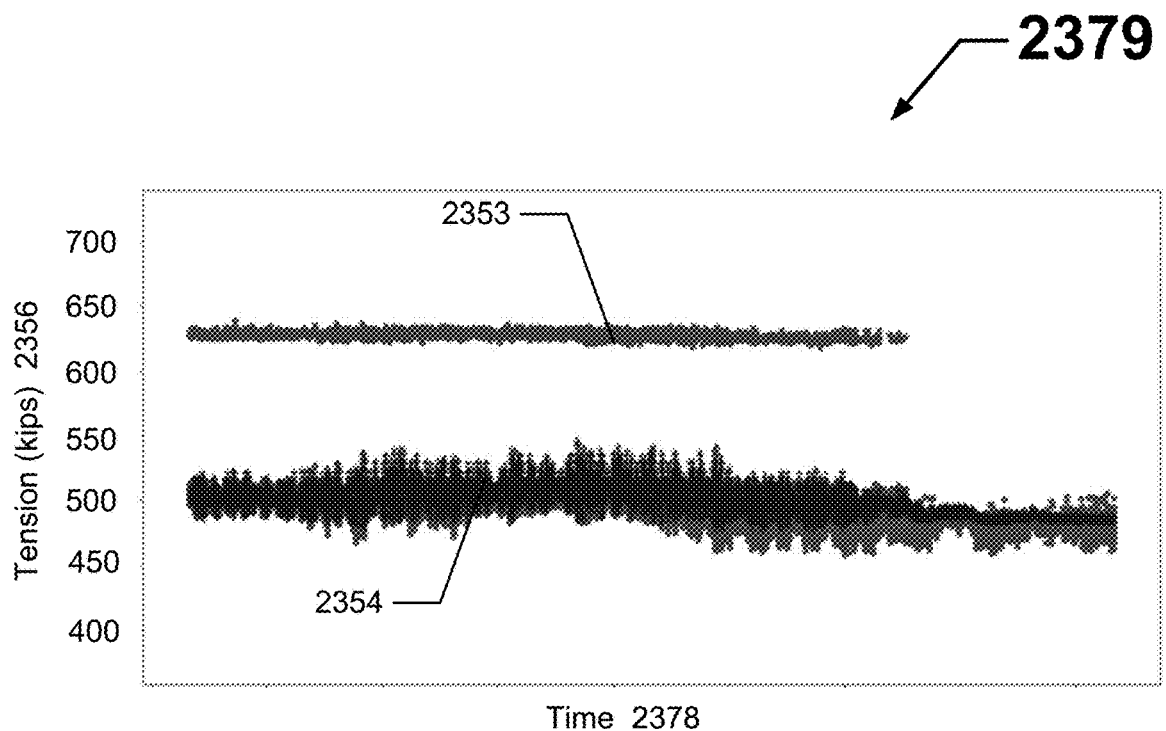
FIGS. 23 and 24 each shows another graph showing how the output of a model can recognize a failed sensor device for a securing system according to certain example embodiments.

An example model can also be used when other types of sensor devices, such as one or more metocean sensor devices 239, fail. For example, detection of a failure of one or more metocean sensor devices 239 (e.g., measuring position and/or motion) does not prohibit an example model from accurately evaluating a securing system. FIG. 23 shows a graph 2379 showing how the output of a model can recognize a failed sensor device for a securing system according to certain example embodiments. Referring to FIGS. 1 through 23, the graph 2379 of FIG. 23 shows plot 2354 for measured values and plot 2353 for predicted values of tension 2356 (in kips) in a mooring line (e.g., mooring line 170-1) over time 2378. The measured values for plot 2354 are received from a mooring line sensor device 290. As the graph 2379 shows, for all but the last quarter of the period of time 2378 shown, the plot 2353 for the predicted values of tension 2356, as generated by an example model, has a number of significant "jumps" relative to the plot 2354.

The graph 2379 shows anomalous "jumps" of the predicted line tension (represented by plot 2254) over time 2378. These "jumps" are well correlated with the intermittent zero/missing heave acceleration readings from an associated metocean sensor device 239 and that are used as inputs for an example model. This anomalous prediction pattern could also be resulted from other intermittent and/or missing motion or position data. In such a case, the controller 204 can identify the metocean sensor device 239 that is generating the erroneous measurements and, in some cases, make adjustments to one or more protocols 232 and/or algorithms 233 to compensate for the erroneous data until the metocean sensor device 239 is repaired or replaced.

Figure 24:
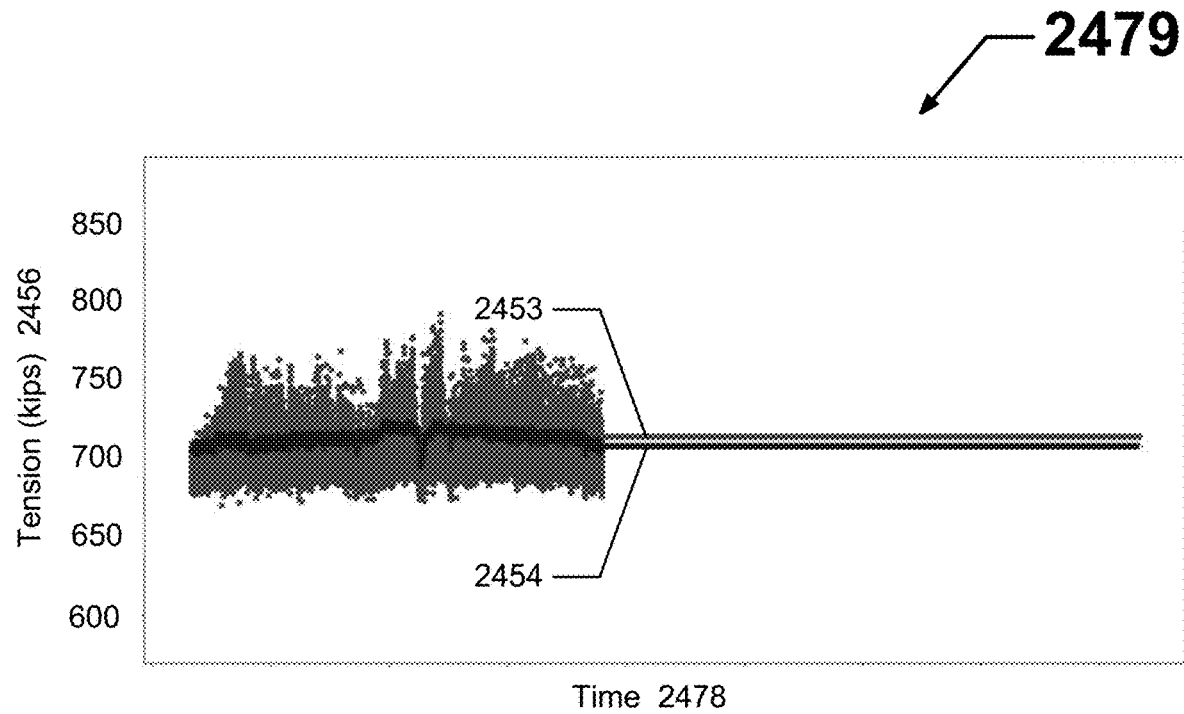

Another example in FIG. 24 shows the breakdown or shutdown of both the GPS and motion monitoring equipment (all metocean sensor devices 239) as the predicted tension 2456 of a mooring line remains constant. Specifically, FIG. 24 shows a graph 2479 showing how the output of a model can recognize a failed sensor device for a securing system according to certain example embodiments. Referring to FIGS. 1 through 24, the graph 2479 of FIG. 24 shows a plot 2454 for measured values and a plot 2453 for predicted values of tension 2456 (in kips) in a mooring line (e.g., mooring line 170-4) over time 2478. The measured values for the plot 2454 are received from a mooring line sensor device 290. As the graph 2479 shows, almost halfway into the period of time 2478 shown, both the plot 2453 and the plot 2454 flatline at constant values for the duration of the time 2478. This indicates that the relevant mooring line sensor device 290, which generates the plot 2454, as well as a significant number of metocean sensor devices 239, which are used as inputs to an example model to generate the plot 2453, have failed simultaneously. The controller 204 can make this determination in real time and promptly notify a user 250 of the failures.

Example embodiments can also be used to detect degradation or failure of a securing system (e.g., securing system 175) or portion thereof (e.g., a mooring line 170). When the tension measurements for a mooring line (e.g., mooring line 170-2) are available from a mooring line sensor device 239, an example model can be used to detect an anomaly in the mooring system that can result from the degradation or even failure of the mooring line sensor device 239, the tensioning equipment located on the floating structure (e.g., floating structure 105), and/or components located off the floating structure. An intrinsic principle of an example model, developed using machine learning, is that reliable prediction can be made when the patterns in the data do not change substantially from the past (or the training dataset). For a securing system that includes mooring lines, in case there is mooring system degradation (e.g., polyester rope elongation) or even failure of a mooring line, and if the patterns shift or vary, the predictive performance of the example model will change accordingly.

Figure 25:
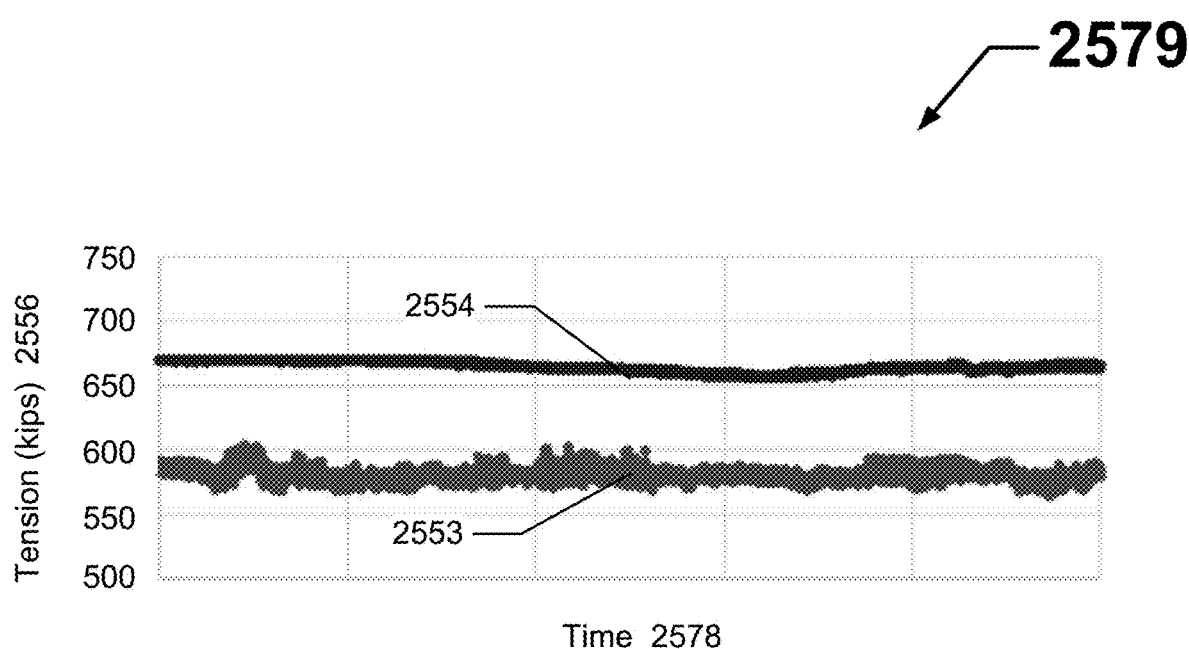
FIG. 25 shows a graph showing how the output of a model can proactively monitor a securing system for a floating structure according to certain example embodiments.

FIG. 25 presents a potential application of an example model used in conjunction with available measured data (e.g., tension data) from a mooring line sensor device 290. Specifically, FIG. 25 shows a graph 2579 showing how the output of a model can proactively monitor a securing system (e.g., securing system 175) for a floating structure (e.g., floating structure 105) according to certain example embodiments. Referring to FIGS. 1 through 25, the graph 2579 of FIG. 25 shows a plot 2554 for measured values and a plot 2553 for predicted values of tension 2556 (in kips) in a mooring line (e.g., mooring line 170-6) over time 2578. The measured values for the plot 2554 are received from a mooring line sensor device 290.

As the graph 2579 shows, for the entire period of time 2578 shown, the tension 2556 of the plot 2553 is consistently about 100 kips less than the tension 2556 of the plot 2554. This indicates a significant deviation between plot 2553 and plot 2554, which raises an alarm with respect to the integrity of the mooring line or, more generally, the securing system. With the information shown in the graph 2579, proactive inspection of the securing system (or at least the particular mooring line) can be performed, which can lead to preventative maintenance measures can be carried out before equipment malfunction occurs.

Although the example in FIG. 25 was not generated using the actual field data after a single mooring line failed, it is anticipated that such a mooring line failure could trigger significant deviation in the tension 2556 between plot 2553 (predicted values from an example model) and plot 2554 (measured values) based on the intrinsic priciple of machine learning. Early response to mitigate the mooring system degradation or a signle mooring line failure could eliminate the escalation of the incident to an catastropic event after an offshore floating facility (or other floating structure) is no longer secured by a securing system.

In step 495, a determination is made as to whether there is a problem with the securing system (e.g., securing system 175). The determination can be made by the controller 204 using one or more protocols 232 and/or algorithms 233. The determination can be made based on the evaluation performed in step 492. If there is a problem with the securing system, then the process proceeds to step 496. If there is no problem with the securing system, then the process proceeds to step 419.

In step 496, the problem with the securing system is communicated to one or more users 250. The problem with the securing system can be communicated by the controller 204 using one or more protocols 232 and/or algorithms 233. Alternatively, the problem with the securing system can be communicated by the network manager 280. The problem can be communicated directly to a user 250 and/or through a user system 255. The problem can be communicated to one or more specific users 250 and/or broadcast generally. The problem can be communicated in one or more of any number of ways (e.g., announcement over a speaker, text message, voicemail message, email, audible alarm, panel alarm).

The communication to a user 250 about the problem with the securing system can be specific as to a component (e.g., mooring line 170-4) of a securing system and/or the problem (e.g., the level of tension in the mooring line 170-2 suggests that the mooring line 170-2 is starting to fail and can last approximately one more month before the problem escalates to a total failure). In certain example embodiments, the communication can also include some short term and long term actions for a user 250 to take to mitigate the effects of the problem found. For example, the communication can suggest that, in the short term, the above-water portions of the securing system (or component thereof) be inspected and that associated coupling features be checked for proper tightness. In the long term, the communication can suggest a specific replacement part and schedule to eliminate the problem with the securing system.

In some cases, the communication can be even more proactive with respect to correcting the problem with the securing system. For example, the communication can notify a user 250 that one or more replacement parts to repair the securing system (or portion thereof) have been ordered, that work crews have been scheduled to repair the problem with the securing system, and that a work schedule has been created for repairing the problem with the securing system.

In step 419, a determination is made as to whether the field operation for which the securing system is being used is continuing. The determination can be made by the controller 204 using one or more protocols 232 and/or algorithms 233. The determination can be made, for example, based on information received from a user 250 (including an associated user system 255), based on information received from the network manager 280, and/or from measurements received from one or more sensor devices. If the field operation is continuing, then the process reverts to step 481. If the field operation is not continuing, then the process proceeds to the END step.

Example embodiments can be used to provide for evaluating, in real time, a securing system for a floating structure. Example embodiments can be used for some or all of a field operation. Example embodiments can be used to make suggest real time adjustments to a securing system (or portion thereof) so that the securing system can have an extended useful life in spite of the harsh environment in which the securing system operates and/or the stresses and strains that the securing system experiences over time. Example embodiments can provide a number of benefits. Such other benefits can include, but are not limited to, reduced use of resources, cost savings, increased flexibility, and compliance with applicable industry standards and regulations.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A method for monitoring a securing system for a floating structure, the method comprising:
    collecting, in real time, a plurality of metocean data from a plurality of metocean sensor devices during a current time period coinciding with a field operation, wherein the field operation is conducted from the floating structure that is stabilized by the securing system, wherein the plurality of metocean sensor devices excludes mooring line sensor devices, and wherein the plurality of metocean data excludes a measurement of a level of tension in a line of the securing system;
    evaluating, in real time, the metocean data using a plurality of algorithms, wherein evaluating the metocean data comprises adjusting the plurality of algorithms in real time based on current metocean data relative to historical metocean data; and
    monitoring, in real time and based on evaluating the metocean data, a condition of the securing system at the current time period.

2. The method of claim 1, wherein the condition of the securing system comprises a calculated level of tension in a line of the securing system.

3. The method of claim 2, wherein the line comprises a mooring line, wherein the method further comprises identifying a calculated failure of the mooring line when the calculated level of tension in the mooring line falls outside a range of acceptable values.

4. The method of claim 3, wherein the calculated failure of the mooring line results in altering or discontinuing the field operation.

5. The method of claim 2, further comprising:
    collecting the measurement of the level of tension in the line by a mooring line sensor device; and
    determining, based on comparing the measurement of the level of tension in the line with the calculated level of tension in the line, that the mooring line sensor device has failed.

6. The method of claim 1, wherein evaluating the metocean data further comprises identifying and removing data points that are faulty.

7. The method of claim 6, further comprising:
    identifying one of the plurality of metocean sensor devices that has failed.

8. The method of claim 1, wherein evaluating the metocean data further comprises selecting data points that affect the condition of the securing system.

9. The method of claim 1, wherein the metocean data comprises a position and motion of the floating structure.

10. The method of claim 1, wherein the metocean data is collected and evaluated continually.

11. The method of claim 1, wherein the plurality of algorithms is developed specifically for the securing system of the floating structure during the field operation.

12. The method of claim 11, wherein the plurality of algorithms is trained and tested continually using the metocean data during prior time periods relative to the current time period during the field operation.

13. A system for monitoring mooring lines positioned in water, the system comprising:
- a plurality of metocean sensor devices for measuring a plurality of metocean data coinciding with a field operation, wherein the field operation is conducted from a floating structure that is stabilized by the mooring lines in the water, wherein the plurality of metocean sensor devices excludes mooring line sensor devices, and wherein the plurality of metocean data excludes a measurement of a level of tension in a line of the securing system; and
- a controller communicably coupled to the plurality of metocean sensor devices, wherein the controller is configured to:
  - collect, in real time, the plurality of metocean data from the plurality of metocean sensor devices;
  - evaluate, in real time, the plurality of metocean data using a plurality of algorithms, wherein evaluating the metocean data comprises adjusting the plurality of algorithms in real time based on current metocean data relative to historical metocean data;
  - monitor, in real time and based on evaluating the plurality of metocean data, a calculated level of tension in each of the mooring lines; and
  - identify, in real time, a calculated failure in at least one of the mooring lines based on the calculated level of tension falling outside a range of acceptable values.

14. The system of claim 13, wherein the plurality of metocean sensor devices is configured to measure at least one of a group consisting of roll, pitch, heave, heading, easting wind, and northing wind.

15. The system of claim 13, wherein the plurality of metocean sensor devices is further configured to measure at least one of a group consisting of pitch rate, heading rate, roll rate, surge acceleration, sway acceleration, and heave acceleration.

16. The system of claim 13, wherein the plurality of metocean data generated by the plurality of metocean sensor devices is used for other aspects of the field operation.

17. The system of claim 13, wherein the floating structure comprises an oilfield platform.

18. The system of claim 13, wherein the floating structure comprises at least one of a group consisting of a pipeline, a riser, and a wind turbine.

19. A non-transitory computer readable medium comprising computer readable program code, which when executed by a computer processor, enables the computer processor to:
- collect, in real time, a plurality of metocean data from a plurality of metocean sensor devices during a field operation, wherein the field operation is conducted from a floating structure that is stabilized by the mooring lines in water, wherein the plurality of metocean sensor devices excludes mooring line sensor devices, and wherein the plurality of metocean data excludes a measurement of a level of tension in a line of the securing system;
- evaluate, in real time, the metocean data using a plurality of algorithms, wherein evaluating the metocean data comprises adjusting the plurality of algorithms in real time based on current metocean data relative to historical metocean data;
- determine, in real time and based on evaluating the metocean data, a calculated level of tension in each of the mooring lines; and
- identify, in real time, a calculated failure in at least one of the mooring lines based on the calculated level of tension falling outside a range of acceptable values.

* * * * *